United States Patent
Kazuno et al.

(10) Patent No.: US 8,557,461 B2
(45) Date of Patent: *Oct. 15, 2013

(54) FUEL CELL VEHICLE

(75) Inventors: Shuichi Kazuno, Utsunomiya (JP); Kazunori Watanabe, Mooka (JP); Hibiki Saeki, Utsunomiya (JP); Takuya Shirasaka, Sakura (JP); Daishi Igarashi, Utsunomiya (JP)

(73) Assignee: Honda Motor Co., Ltd, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/605,494

(22) Filed: Sep. 6, 2012

(65) Prior Publication Data

US 2013/0065090 A1    Mar. 14, 2013

(30) Foreign Application Priority Data

Sep. 14, 2011   (JP) .................................. 2011-200069

(51) Int. Cl.
*H01M 8/04* (2006.01)
(52) U.S. Cl.
USPC ............................. 429/432; 429/428; 429/433
(58) Field of Classification Search
None
See application file for complete search history.

(56) References Cited

U.S. PATENT DOCUMENTS

| | | | |
|---|---|---|---|
| 8,153,315 B2 * | 4/2012 | Imai et al. ...................... | 429/430 |
| 8,460,835 B2 | 6/2013 | Imanishi et al. | |
| 2005/0048335 A1 * | 3/2005 | Fields et al. .................... | 429/22 |
| 2006/0102397 A1 * | 5/2006 | Buck et al. .................... | 180/65.3 |
| 2009/0029197 A1 | 1/2009 | Hibino et al. | |
| 2011/0033762 A1 | 2/2011 | Yoshida | |

FOREIGN PATENT DOCUMENTS

| | | |
|---|---|---|
| JP | 2007-5038 A | 1/2007 |
| JP | 2009-054465 | 3/2009 |
| JP | 2009-151997 | 7/2009 |
| JP | 2009-165244 | 7/2009 |

OTHER PUBLICATIONS

Office Action issued in counterpart Japanese Patent Application No. 2011-200069, and partial translation thereof. (Mailed Jul. 16, 2013).

* cited by examiner

*Primary Examiner* — John S Maples
(74) *Attorney, Agent, or Firm* — Arent Fox LLP

(57) ABSTRACT

A fuel cell vehicle is provided. The voltage of a fuel cell is fixed, by a DC/DC converter, to a voltage outside an oxidation reduction progress voltage range of the fuel cell. In this state, oxygen concentration or hydrogen concentration is decreased by a gas supply unit, and electric power outputted from the fuel cell is decreased. In this state, regenerative electric power generated by regeneration is collected into a battery.

5 Claims, 33 Drawing Sheets

FUEL CELL VEHICLE

CROSS-REFERENCE TO RELATED APPLICATION

This application is based upon and claims the benefit of priority from Japanese Patent Application No. 2011-200069 filed on Sep. 14, 2011, of which the contents are incorporated herein by reference.

BACKGROUND OF THE INVENTION

1. Field of the Invention

The present invention relates to a fuel cell vehicle which makes it possible to prevent degradation of a fuel cell for performing power generation by electrochemical reactions of reactant gases (oxygen-containing gas and fuel gas), and improve system efficiency thereof during regeneration of electric power.

2. Description of the Related Art

A fuel cell employs a membrane electrode assembly (MEA) which includes an anode, a cathode, and a solid polymer electrolyte membrane interposed between the anode and the cathode. The solid polymer electrolyte membrane is formed by impregnating a thin membrane of perfluorosulfonic acid with water, for example. Each of the cathode and the anode has a gas diffusion layer such as a carbon paper, and an electrode catalyst layer of catalyst particles of platinum alloy or the like (hereinafter also referred to as the Pt catalyst) supported on porous carbon particles. The carbon particles are deposited uniformly on the surface of the gas diffusion layer. The electrode catalyst layer of the anode and the electrode catalyst layer of the cathode are fixed to both surfaces of the solid polymer electrolyte membrane, respectively.

A technique of suppressing degradation of the fuel cell is proposed in Japanese Laid-Open Patent Publication No. 2007-005038 (hereinafter referred to as JP 2007-005038 A). In the technique proposed in JP 2007-005038 A, power generation of the fuel cell is performed such that an oxidation reduction electric potential where sintering phenomenon of the Pt catalyst (aggregation of the Pt catalyst) occurs is avoided.

SUMMARY OF THE INVENTION

In a fuel cell vehicle, regenerative electric power is generated at the time of deceleration or the like of the vehicle. Preferably, the regenerative electric power should be supplied to a battery for charging in order to improve the system efficiency.

According to the disclosure of JP 2007-005038 A, even if the opening degree of an accelerator pedal is increased, electric power is supplied from the battery with the output voltage of the fuel cell being limited to about 0.7 V until the SOC value of the battery becomes less than a first charging threshold (lower limit target value of the SOC value). When it is detected that the SOC value becomes less than the first charging threshold, by increasing electric power generated in power generation of the fuel cell, the output voltage is decreased from about 0.7 V to charge the battery. Thereafter, even if the opening angle of the accelerator pedal is decreased, the battery is charged while maintaining the state where electric power generated in power generation of the fuel cell is increased until the SOC value exceeds a second charging threshold (upper limit target value of the SOC value).

In this manner, by limiting the output voltage of the fuel cell to an electric potential equal to or less than the oxidation reduction potential, it is possible to suppress degradation of the fuel cell. However, even if the accelerator opening degree is decreased, i.e., during the state where regenerative energy can be collected, the state where electrical energy generated by the fuel cell is increased is continued, and as a result, the system efficiency becomes poor disadvantageously.

The present invention has been made in consideration of these problems, and an object of the present invention is to provide a fuel cell vehicle which makes it possible to improve the efficiency of collecting regenerative electric power while suppressing degradation of a fuel cell, and improve the system efficiency consequently.

A fuel cell vehicle according to the present invention includes a fuel cell for performing power generation by inducing, by catalyst, reaction of a first gas containing oxygen and a second gas containing hydrogen supplied to the fuel cell, a gas supply unit for supplying at least one of the first gas and the second gas to the fuel cell, a voltage regulator for regulating output voltage of the fuel cell, a drive motor as a load driven by electric power outputted from the fuel cell, an energy storage device for storing electric power regenerated by the drive motor, and a control unit for controlling the fuel cell, the gas supply unit, the voltage regulator, the drive motor, and the energy storage device. At the time of regeneration of electric power by the drive motor, the control unit controls the voltage regulator to fix the voltage of the fuel cell at a predetermined voltage outside an oxidation reduction progress voltage range of the fuel cell where oxidation reduction proceeds while controlling the gas supply unit to decrease oxygen concentration or hydrogen concentration thereby for decreasing electric power outputted from the fuel cell.

In the present invention, by maintaining the state where the voltage of the fuel cell is fixed to a predetermined voltage outside the oxidation reduction progress voltage range where oxidation reduction proceeds in the fuel cell, regenerative electric power is collected while degradation of the fuel cell is suppressed. In this state, by decreasing oxygen concentration or hydrogen concentrate by the gas supply unit to thereby decrease the electric power outputted from the fuel cell, power generation electric power (instantaneous power generation electric power) supplied from the fuel cell for charging of the energy storage device is decreased. Thus, regenerative electric power can be collected suitably. In this manner, the efficiency of collecting regenerative electric power is increased while suppressing degradation of the fuel cell. Consequently, it is possible to improve the system efficiency.

In this case, the predetermined voltage outside the oxidation reduction progress voltage range of the fuel cell may be set to a voltage that exceed the upper limit voltage of the oxidation reduction progress voltage range. In this case, the output voltage of the drive motor during regeneration becomes high. In this manner, further improvement in the regeneration efficiency is achieved while degradation is suppressed.

The predetermined voltage outside the oxidation reduction progress voltage range of the fuel cell may be set to a voltage where degradation of the fuel cell is small, within a range of the voltage that exceeds the upper limit voltage of the oxidation reduction progress voltage range. In this case, suppression of degradation can be maximized (progress of the degradation can be minimized).

Further, if the control unit determines that the temperature of the fuel cell is a threshold temperature or less, the control unit may set the predetermined voltage outside the oxidation reduction progress voltage range of the fuel cell to a voltage that is lower than the lower limit voltage of the oxidation reduction progress voltage range. In this manner, the heat loss of the fuel cell is increased, and the fuel cell can be warmed up accordingly.

In order to further effectively warm up the fuel cell, if the control unit determines that the temperature of the fuel cell is the threshold temperature or less, preferably, the control unit controls a cooling unit to decrease the flow rate of a coolant.

In the present invention, during regeneration of electric power by the drive motor, in the state where the voltage of the fuel cell is fixed to a predetermined voltage outside the oxidation reduction progress voltage range where the oxidation reduction proceeds, the oxygen concentration or the hydrogen concentration is decreased to thereby decrease the electric power outputted from the fuel cell. In this manner, the efficiency of collecting the regenerative electric power is improved while suppressing degradation of the fuel cell. Consequently, it is possible to improve the system efficiency (e.g., improve the fuel economy of the fuel cell vehicle).

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
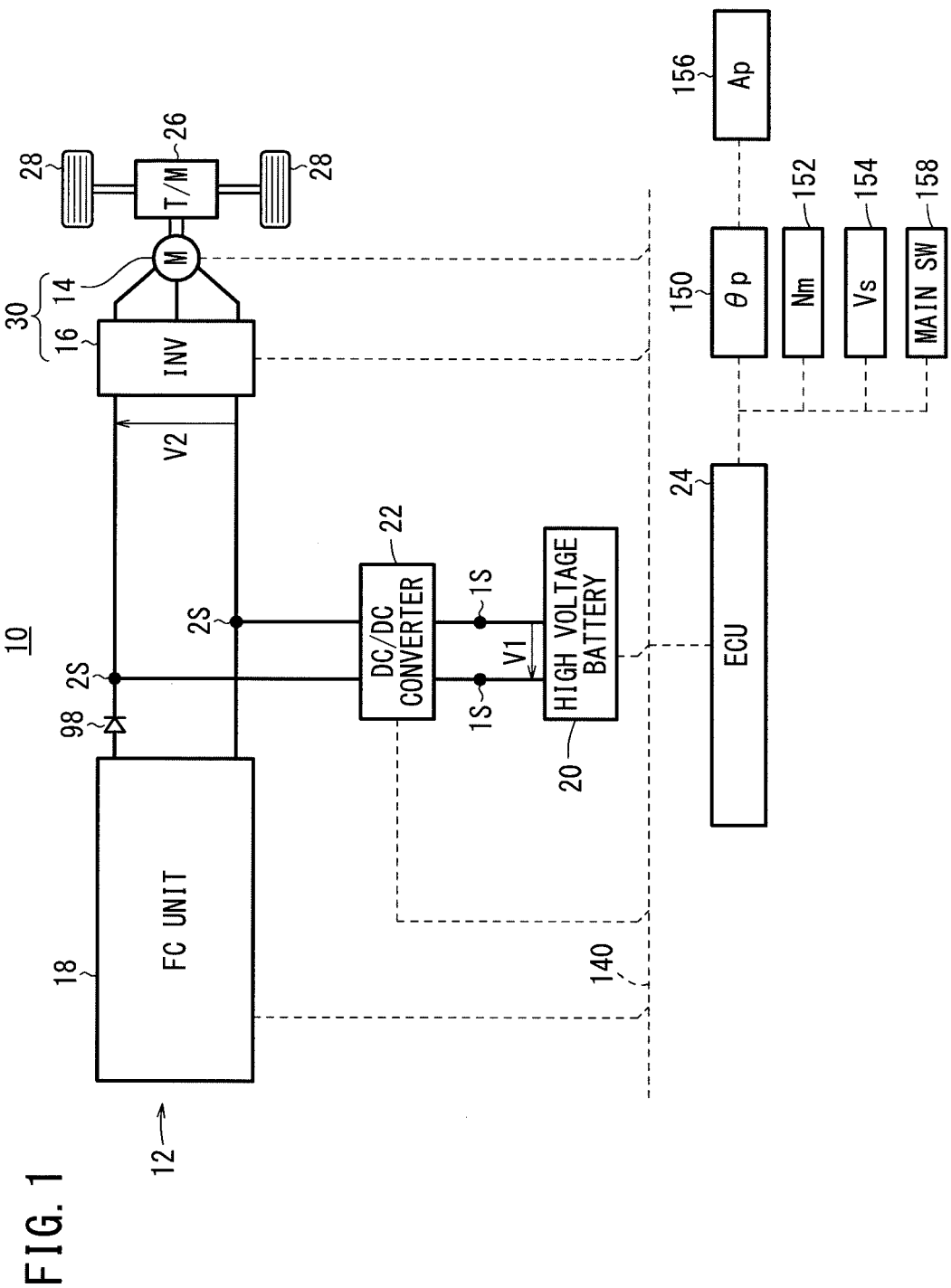
FIG. 1 is a diagram schematically showing an overall structure of a fuel cell vehicle equipped with a fuel cell system according to an embodiment of the present invention.
Figure 2:
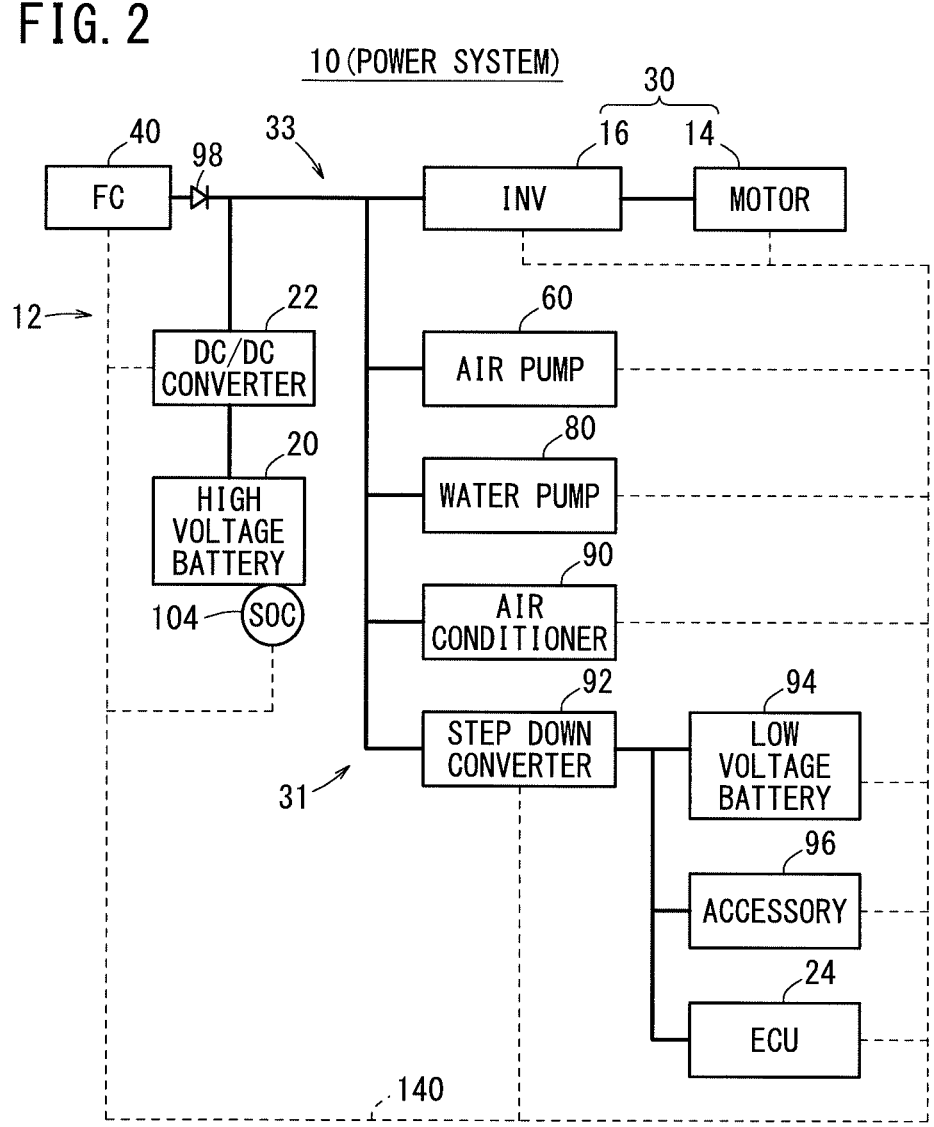
FIG. 2 is a block diagram showing a power system of the fuel cell vehicle.

FIG. 1 is a diagram schematically showing the overall structure of a fuel cell vehicle 10 (hereinafter referred to as the "FC vehicle 10") equipped with a fuel cell system 12 (hereinafter referred to as the "FC system 12") according to an embodiment of the present invention. FIG. 2 is a block diagram showing a power system of the FC vehicle 10. As shown in FIGS. 1 and 2, the FC vehicle 10 includes a traction motor 14 (drive motor) and an inverter (bidirectional DC-AC converter) 16 in addition to the FC system 12.

The FC system 12 includes a fuel cell unit 18 (hereinafter referred to as the "FC unit 18"), a high voltage battery (hereinafter referred to as the "battery 20") (energy storage device), a DC/DC converter (voltage regulator) 22, and an electronic control unit 24 (hereinafter referred to as the "ECU 24") (control unit).

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20 or the like (see FIG. 2).

The inverter 16 (also referred to as PDU (Power Drive Unit)) has three-phase full bridge structure, and carries out DC/AC conversion to convert direct current into alternating current in three phases. The inverter 16 supplies the alternating current to the motor 14, and supplies the direct current after AC/DC conversion as a result of regeneration of the motor 14 to the battery 20 or the like through a DC/DC converter 22.

It should be noted that the motor 14 and the inverter 16 are collectively referred to as a load 30 (also referred to as a main load 30 in a case where it is necessary to distinguish between the load 30 and loads of auxiliary devices (auxiliary device loads) 31 to be described later). The main load 30 and the auxiliary device loads 31 will be collectively referred to as a load 33 (also referred to as a total load 33).

Figure 3:
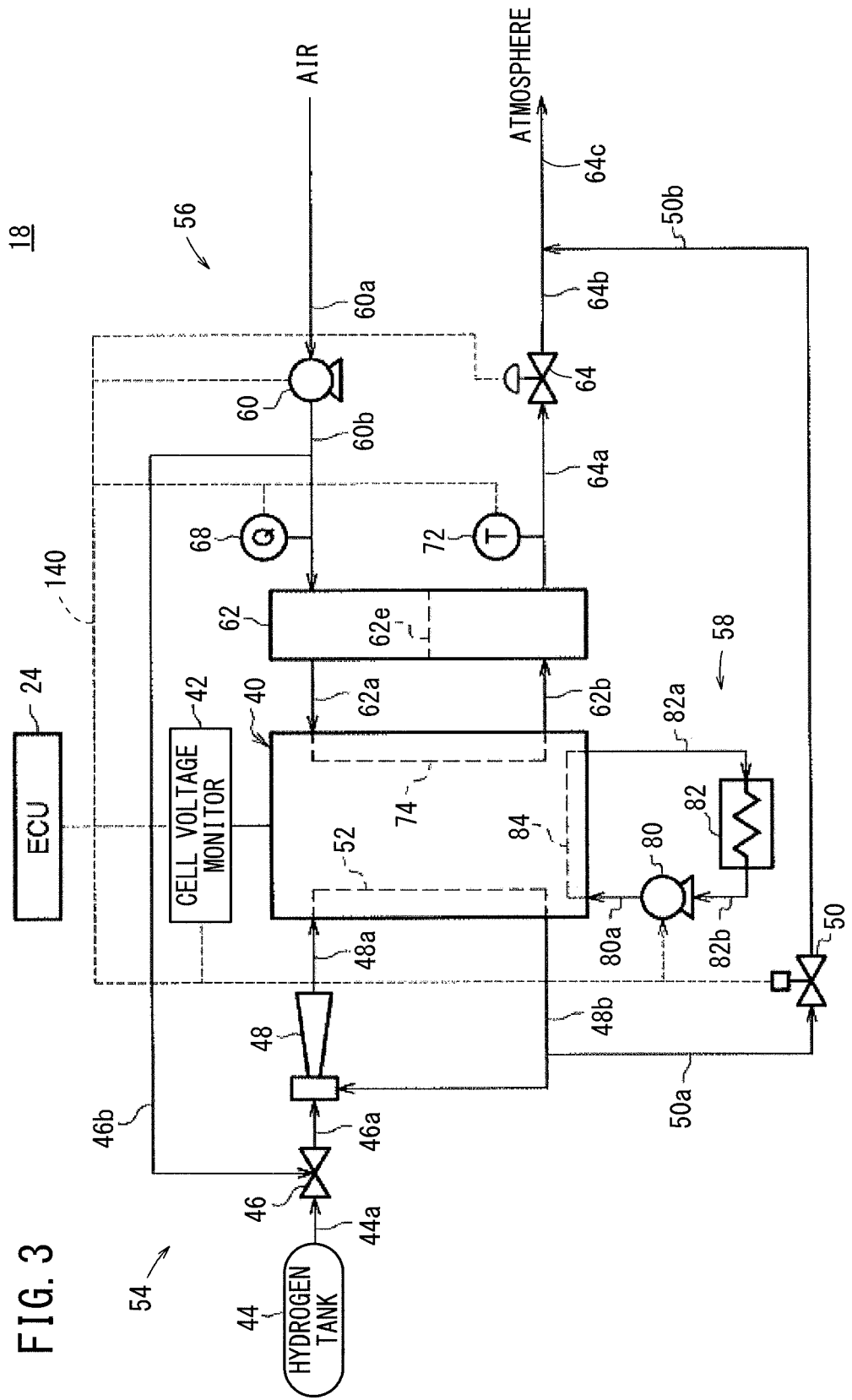
FIG. 3 is a diagram schematically showing a structure of a fuel cell unit according to the embodiment.

FIG. 3 is a diagram schematically showing a structure of the FC unit 18. The FC unit 18 includes a fuel cell stack 40 (hereinafter referred to as the "FC stack 40" or the "FC 40"), an anode system 54 for supplying hydrogen (fuel gas) to, and discharging the hydrogen (fuel gas) from anodes of the FC stack 40, a cathode system 56 for supplying the air (oxygen-containing gas) to, and discharging the air (oxygen-containing gas) from cathodes of the FC stack 40, a cooling system (cooling unit) 58 for circulating coolant water (coolant) to cool the FC stack 40, and a cell voltage monitor 42.

For example, the FC stack 40 is formed by stacking fuel cells (hereinafter referred to as the "FC cells") each including an anode, a cathode, and a solid polymer electrolyte membrane interposed between the anode and the cathode.

The anode system 54 includes a hydrogen tank 44, a regulator 46, an ejector 48, and a purge valve 50. The hydrogen tank 44 contains hydrogen as the fuel gas. The hydrogen tank 44 is connected to the inlet of an anode channel 52 of FC 40 through a pipe 44a, a regulator 46, a pipe 46a, an ejector 48, and a pipe 48a. Thus, the hydrogen in the hydrogen tank 44 can be supplied to the anode channel 52 through the pipe 44a or the like. A shut-off valve (not shown) is provided in the pipe 44a. At the time of power generation of the FC stack 40, the shut-off valve is opened by the ECU 24.

The regulator 46 regulates the pressure of the supplied hydrogen to a predetermined value, and discharges the hydrogen. That is, the regulator 46 regulates the pressure on the downstream side (pressure of the hydrogen on the anode side) in response to the pressure (pilot pressure) of the air on the cathode side supplied through a pipe 46b. Therefore, the pressure of the hydrogen on the anode side is linked to the pressure of the air on the cathode side. As described later, by changing the rotation number or the like of an air pump 60 so as to change the oxygen concentration, the pressure of the hydrogen on the anode side changes as well.

The ejector 48 generates a negative pressure by ejecting hydrogen from the hydrogen tank 44 through a nozzle. By this negative pressure, the anode off gas can be sucked from a pipe 48b.

The outlet of the anode channel 52 is connected to a suction port of the ejector 48 through the pipe 48b. The anode off gas discharged from the anode channel 52 flows through the pipe 48b and again into the ejector 48 to allow circulation of the anode off gas (hydrogen).

The anode off gas contains hydrogen that has not been consumed in the electrode reaction at the anodes, and water vapor. Further, a gas-liquid separator (not shown) is provided at the pipe 48b for separating/recovering water components (condensed water (liquid) and water vapor (gas)) in the anode off gas.

Part of the pipe 48b is connected to a dilution device (not shown) provided in a pipe 64c, through a pipe 50a, a purge valve 50, and a pipe 50b. When it is determined that power generation of the FC stack 40 is not performed stably, the purge valve 50 is opened for a predetermined period in accordance with an instruction from the ECU 24. In the dilution device, the hydrogen in the anode off gas from the purge valve 50 is diluted by the cathode off gas and discharged to atmosphere.

The cathode system 56 includes the air pump 60 (gas supply unit), a humidifier 62, and a back pressure valve 64.

The air pump 60 compresses the external air (air), and supplies the compressed air to the cathode. A suction port of the air pump 60 is connected to the outside (outside of the vehicle, outside air of the vehicle) through a pipe 60a, and an ejection port of the air pump 60 is connected to the inlet of a cathode channel 74 through a pipe 60b, the humidifier 62, and a pipe 62a. When the air pump 60 is operated in accordance with an instruction from the ECU 24, the air pump 60 sucks the air outside the vehicle through the pipe 60a, compresses the sucked air, and supplies the compressed air to the cathode channel 74 of FC 40 through the pipe 60b or the like under pressure.

The humidifier 62 has a plurality of hollow fiber membranes 62e having water permeability. The humidifier 62 humidifies the air flowing toward the cathode channel 74 through the hollow fiber membranes 62e by exchanging water components between the air flowing toward the cathode channel 74 and the highly humidified cathode off gas discharged from the cathode channel 74.

A pipe 62b, the humidifier 62, a pipe 64a, the back pressure valve 64, the pipe 64b, and the pipe 64c are provided at the outlet of the cathode channel 74. The cathode off gas (oxygen-containing off gas) discharged from the cathode channel 74 is discharged from the pipe 64c to the outside of the vehicle (to atmosphere) through the pipe 62b or the like.

For example, the back pressure valve 64 is a butterfly valve, and the opening degree of the back pressure valve 64 is controlled by the ECU 24 to regulate the pressure of the air in the cathode channel 74. More specifically, if the opening degree of the back pressure valve 64 becomes small, the pressure of the air in the cathode channel 74 is increased, and oxygen concentration per volume flow rate (volume concentration) becomes high. Conversely, if the opening degree of the back pressure valve 64 becomes large, the pressure of the air in the cathode channel 74 is decreased, and oxygen concentration per volume flow rate (volume concentration) becomes low.

A temperature sensor 72 is attached to the pipe 64a. The temperature sensor 72 detects the temperature of the cathode off gas, and outputs the detected temperature to the ECU 24.

The cooling system 58 includes a water pump 80 and a radiator (heat radiator) 82. The water pump 80 circulates the coolant water (coolant), and an ejection port of the water pump 80 is connected to a suction port of the water pump 80 through a pipe 80a, a coolant channel 84 of the FC stack 40, a pipe 82a, the radiator 82, and a pipe 82b in the order listed. When the water pump 80 is operated in accordance with an instruction from the ECU 24, the coolant water is circulated between the coolant channel 84 and the radiator 82 to cool the FC stack 40.

The cell voltage monitor 42 is a measurement instrument for detecting the cell voltage Vcell of each of unit cells of the FC stack 40. The cell voltage monitor 42 includes a monitor body, and a wire harness connecting the monitor body with each of the unit cells. The monitor body scans all of the unit cells at predetermined intervals to detect the cell voltage Vcell of each cell, and calculates the average cell voltage and the lowest cell voltage. Then, the monitor body outputs the average cell voltage and the lowest cell voltage to the ECU 24.

As shown in FIG. 2, electric power from the FC stack 40 (hereinafter referred to as the "FC electric power Pfc") is supplied to the inverter 16 and the motor 14 (during power running), and to the high voltage battery 20 through the DC/DC converter 22 (during charging). Further, the FC electric power Pfc is supplied to the air pump 60, the water pump 80, the air conditioner 90, a step down converter 92 (step down DC/DC converter), a low voltage battery 94, an accessory 96, and the ECU 24. A backflow prevention diode 98 is disposed between the FC stack 40 and the inverter 16 and the DC/DC converter 22. Further, the power generation voltage of the FC 40 (hereinafter referred to as the "FC voltage Vfc") is detected by a voltage sensor 100 (FIG. 4), and the power generation current of the FC 40 (hereinafter referred to as the FC current Ifc") is detected by a current sensor 102. The FC voltage Vfc and the FC current Ifc are outputted to the ECU 24.

The battery 20 is an energy storage device (energy storage) containing a plurality of battery cells. For example, a lithium-ion secondary battery, a nickel hydrogen secondary battery, or a capacitor can be used as the battery 20. In the embodiment, the lithium-ion secondary battery is used. The output voltage [V] of the battery 20 (hereinafter referred to as the "battery voltage Vbat or primary voltage V1") is detected by a voltage sensor 120, and the output current [A] of the battery 20 (hereinafter referred to as the "battery current Ibat or primary current I1") is detected by a current sensor 124. The battery voltage Vbat and the battery current Ibat are outputted to the ECU 24. The remaining battery level (state of charge) (hereinafter referred to as the "SOC") [%] of the battery 20 is detected by a SOC sensor 104 (FIG. 2), and outputted to the ECU 24.

Under the control of the ECU 24, the DC/DC converter 22 controls targets to which the FC electric power Pfc from the FC unit 18, the electric power [W] supplied from the battery 20 (hereinafter referred to as the "battery electric power Pbat"), and the regenerative electric power Preg from the motor 14 are supplied.

Figure 4:
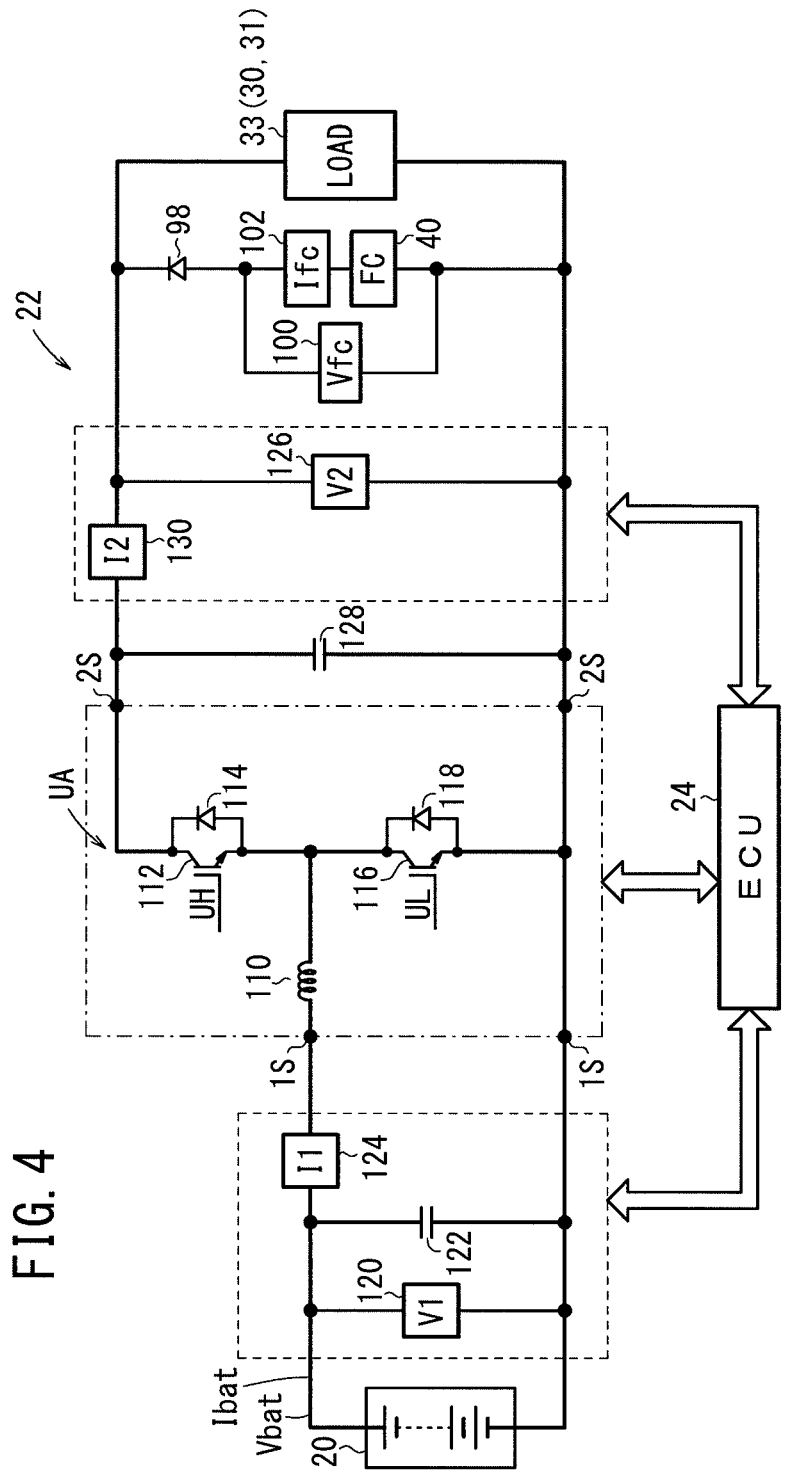
FIG. 4 is a circuit diagram showing details of a DC/DC converter according to the embodiment.

FIG. 4 shows an example of the DC/DC converter 22 in the present embodiment. As shown in FIG. 4, one side of the DC/DC converter 22 is connected to the primary side 1S where the battery 20 is provided, and the other side of the DC/DC converter 22 is connected to the secondary side 2S, which is connection points between the load 33 and the FC stack 40.

The DC/DC converter 22 is basically a chopper type step up/down voltage converter for increasing the voltage on the primary side 1S (primary voltage V1=Vbat) [V] to the voltage on the secondary side 2S (secondary voltage V2) [V] (V1≤V2), and decreasing the secondary voltage V2 to the primary voltage V1 (V1=Vbat).

As shown in FIG. 4, the DC/DC converter 22 includes a phase arm UA interposed between the primary side 1S and the secondary side 2S, and a reactor 110.

The phase arm UA includes an upper arm element (an upper arm switching element 112 and a diode 114) as a high-side arm and a lower arm element (a lower arm switching element 116 and a diode 118) as a low-side arm. For example, MOSFET, IGBT, or the like is adopted in each of the upper arm switching element 112 and the lower arm switching element 116.

The reactor 110 is interposed between the middle point (common connection point) of the phase arm UA and the positive electrode of the battery 20. The reactor 110 is operated to release and accumulate energy during voltage conversion between the primary voltage V1 and the secondary voltage V2 by the DC/DC converter 22.

The upper arm switching element 112 is turned on when high level of a gate drive signal (drive voltage) UH is outputted from the ECU 24, and the lower arm switching element 116 is turned on when high level of a gate drive signal (drive voltage) UL is outputted from the ECU 24.

The ECU 24 detects primary voltage V1 [V] by the voltage sensor 120 provided in parallel with a smoothing capacitor 122 on the primary side 1S, and detects electrical current on the primary side 1S (primary current I1) [A] by the current sensor 124. Further, the ECU 24 detects secondary voltage V2 [V] by a voltage sensor 126 provided in parallel with a smoothing capacitor 128 on the secondary side 2S, and detects electrical current on the secondary side 2S (secondary current I2) [A] by a current sensor 130.

At the time of stepping up the voltage of the DC/DC converter 22, at the first timing, the gate drive signal UL is switched to high level, and the gate drive signal UH is switched to low level. Electricity from the battery 20 is stored in the reactor 110 (through a current path extending from the positive side of the battery 20 through the reactor 110 and the lower arm switching element 116 to the negative side of the battery 20). At the second timing, the gate drive signal UL is switched to low level, and the gate drive signal UH is switched to low level. Electricity stored in the reactor 110 is supplied to the secondary side 2S through the diode 114 (through a current path extending from the positive side of the battery 20 through the reactor 110, the diode 114, the positive side of the secondary side 2S, the load 33 or the like, and the negative side of the secondary side 2S to the negative side of the battery 20). Thereafter, the first timing and the second timing are repeated during the period in which the voltage is stepped up.

At the time of stepping down the voltage of the DC/DC converter 22, at the first timing, the gate drive signal UH is switched to high level, and the gate drive signal UL is switched to low level. Electricity from the secondary side 2S (FC stack 40 or the load 33 during electric power regeneration by the motor 14) is stored in the reactor 110, and with the electricity, the battery 20 is charged. At the second timing, the gate drive signal UH is switched to low level, and the gate drive signal UL is switched to low level. Electricity stored in the reactor 110 is supplied to the battery 20 through the diode 118, and with the electricity, the battery 20 is charged. As can be seen from FIG. 2, the regenerative electric power Preg can be supplied to loads 31 of auxiliary devices such as the air pump 60. Thereafter, the first timing and the second timing are repeated during the period in which the voltage is stepped down.

As described above, the DC/DC converter 22 is operated as a chopper type converter. Further, the DC/DC converter 22 can be operated as a direct connection type converter. In the case where the DC/DC converter 22 is operated as the direction connection type converter, when the gate drive signal UH is switched to high level at the duty of 100 [%], and the gate drive signal UL is switched to low level at the duty of 0 [%], thereby discharging electric power from the battery 20, electrical current is supplied from the primary side 1S to the secondary side 2S through the diode 114 (e.g., electric power is supplied from the battery 20 to the load 33). At the time of charging the battery 20 with electric power, the electric power is supplied from the secondary side 2S to the battery 20 through the upper arm switching element 112 (e.g., regenerative electric power Preg is supplied from the motor 14 to the battery 20).

The ECU 24 controls the motor 14, the inverter 16, the FC unit 18, the auxiliary device loads 31, the battery 20, the DC/DC converter 22, etc. through a communication line 140 (see e.g., FIG. 1). For implementing the control, programs stored in a memory (ROM) are executed, and detection values obtained by various sensors such as the cell voltage monitor 42, the flow rate sensors 68, the temperature sensor 72, the voltage sensors 100, 120, 126, the current sensors 102, 124, 130, and the SOC sensor 104 are used.

In addition to the above sensors, the various sensors herein include an opening degree sensor 150, a motor rotation number sensor 152, and a vehicle velocity sensor 154 (FIG. 1). The opening degree sensor 150 detects the opening degree (accelerator opening degree) θp [degrees] of an accelerator pedal 156, which is an accelerator pedal angle, and the motor rotation number sensor 152 detects the rotation number Nm [rpm] of the motor 14. The vehicle velocity sensor 154 detects the vehicle velocity Vs [km/h] of the FC vehicle 10. Further, a main switch 158 (hereinafter referred to as the "main SW 158") is connected to the ECU 24. The main SW 158 switches between supply and non-supply of the electric power from the FC unit 18 and the battery 20 to the motor 14. This main SW 158 can be operated by a user and corresponds to the ignition switch of an engine vehicle.

The ECU 24 includes a microcomputer. Further, as necessary, the ECU 24 has a timer and input/output (I/O) interfaces such as an A/D converter and a D/A converter. The ECU 24 may comprise only a single ECU. Alternatively, the ECU 24 may comprise a plurality of ECUs for each of the motor 14, the FC unit 18, the battery 20, and the DC/DC converter 22.

After the load required by the FC system 12, i.e., required by the FC vehicle 10 as a whole is determined based on the state of the FC stack 40, the state of the battery 20, and the state of the motor 14, and also based on inputs (load requests) from various switches and various sensors, the ECU 24 determines allocation (shares) of loads through adjustment, and more specifically determines a good balance among a load which should be assigned to the FC stack 40, a load which should be assigned to the battery 20, and a load which should be assigned to the regenerative power supply (motor 14), and sends instructions to the motor 14, the inverter 16, the FC unit 18, the battery 20, and the DC/DC converter 22.

[Explanation of Basic Control Operation]

Next, operation of basic control in the ECU 24 will be described. On the premise of the basic control, first through third embodiments will be described later.

Figure 5:
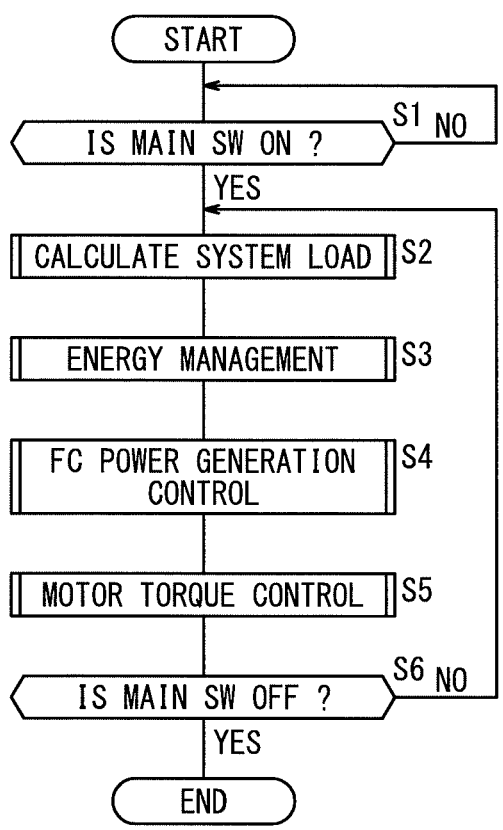
FIG. 5 is a flow chart showing basic control (main routine) in an electronic control unit (ECU)

FIG. 5 is a flow chart showing basic control (main routine) in the ECU 24. In step S1, the ECU 24 determines whether or not the main SW 158 is in an ON state. If the main SW 158 is not in the ON state (S1: NO), step S1 is repeated. If the main SW 158 is in the ON state (S1: YES), the control proceeds to step S2. In step S2, the ECU 24 calculates the load (system load Psys or system requirement load Psys) [W] required by the FC system 12.

In step S3, the ECU 24 performs energy management of the FC system 12 based on the calculated system load Psys. The energy management herein is intended to suppress degradation of the FC stack 40, and improve the efficiency in the output (system efficiency) of the entire FC system 12.

In step S4, based on the results of energy management operation, the ECU 24 implements control for peripheral devices of the FC stack 40, i.e., the air pump 60, the back pressure valve 64, and the water pump 80 (FC power generation control). In step S5, the ECU 24 implements torque control of the motor 14.

In step S6, the ECU 24 determines whether or not the main SW 158 is in an OFF state. If the main SW 158 is not in the OFF state (S6: NO), the control returns to step S2. If the main SW 158 is in the OFF state (S6: YES), the current process is finished.

Figure 6:
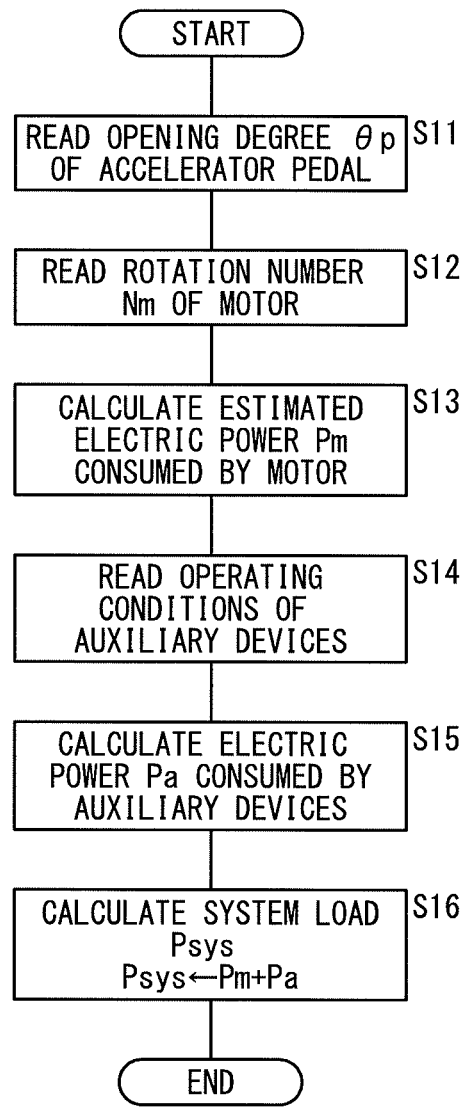
FIG. 6 is a flow chart of calculating a system load.

FIG. 6 is a flow chart for calculating the system load Psys in step S2. In step S11, the ECU 24 reads the opening degree θp of the accelerator pedal 156 from the opening degree sensor 150. In step S12, the ECU 24 reads the rotation number Nm [rpm] of the motor 14 from the motor rotation number sensor 152.

Figure 7:
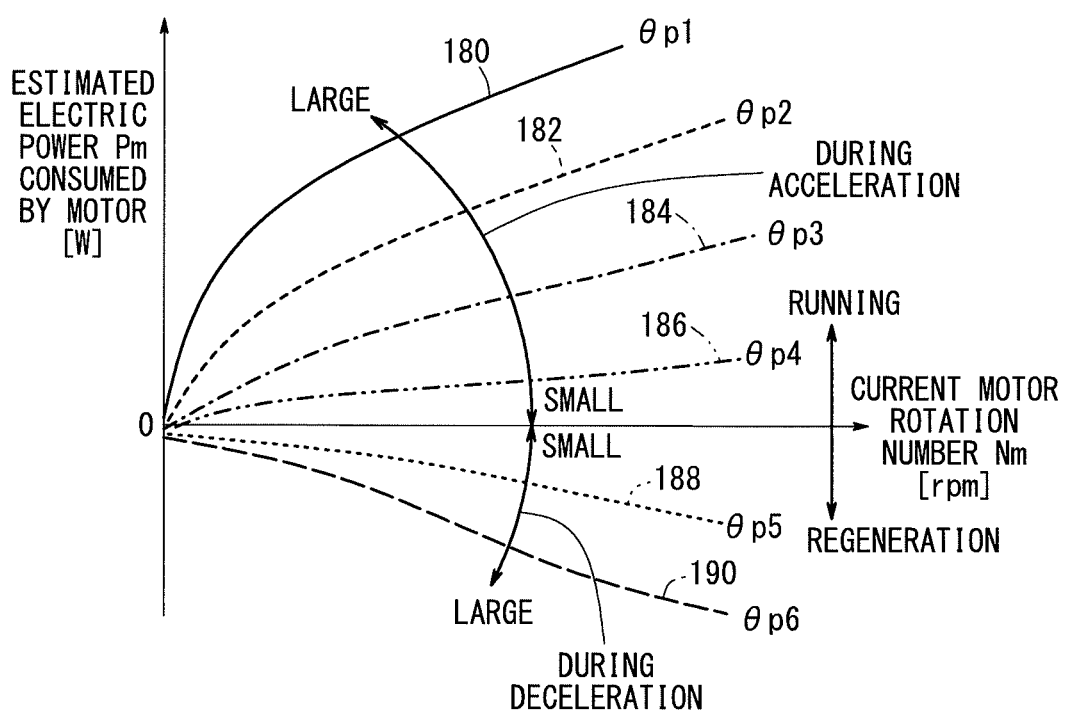
FIG. 7 is a graph showing the relationship between the current rotation number of a motor and the estimated electric power consumed by the motor.

In step S13, the ECU 24 calculates the estimated electric power Pm [W] consumed by the motor 14 based on the opening degree θp and the rotation number Nm. Specifically, in a map (characteristics) as shown in FIG. 7, the relationship between the rotation number Nm [rpm] of the motor 14 and the estimated electric power Pm [W] consumed by the motor 14 is stored for each opening degree θp. For example, in the case where the opening degree θp is θp1, a characteristic 180 is used. Likewise, in the cases where the opening degrees θp are θp2, θp3, θp4, θp5, and θp6, characteristics 182, 184, 186, 188, and 190 are used, respectively. After the characteristic indicating the relationship between the rotation number Nm and the estimated consumed electric power Pm is determined based on the opening degree θp, the estimated consumed electric power Pm in correspondence with the rotation number Nm is determined based on the determined characteristic. During acceleration in the power running mode, the estimated consumed electric power Pm has a positive value. During deceleration in the regenerating mode, the estimated consumed electric power Pm has a negative value. That is, in this mode, the estimated consumed electric power Pm indicates estimated regenerative electric power.

In step S14, the ECU 24 reads data of the current operating conditions from the auxiliary device loads 31. For example, as shown in FIG. 2, the auxiliary devices herein include high voltage auxiliary devices, such as the air pump 60, the water pump 80, and the air conditioner 90, and low voltage auxiliary devices, such as the low voltage battery 94, the accessory 96, and the ECU 24. For example, as for the operating condition of the air pump 60, the rotation number Nap [rpm] of the air pump 60 is read. As for the operating condition of the water pump 80, the rotation number Nwp [rpm] of the water pump 80 is read. As for the operating condition of the air conditioner 90, output settings of the air conditioner 90 are read.

In step S15, the ECU 24 calculates the electric power Pa [W] consumed by the auxiliary devices depending on the present operating conditions of the auxiliary devices.

In step S16, the ECU 24 calculates the sum of the estimated electric power Pm consumed by the motor 14 and electric power Pa consumed by the auxiliary devices (provisional system load Pm+Pa) to determine the estimated electric power consumption in the entire FC vehicle 10. That is, the ECU 24 calculates the system load Psys (Psys=Pm+Pa, also denoted as Psys←Pm+Pa).

As described above, the energy management according to the present embodiment is aimed to suppress degradation of the FC stack 40, and improve the efficiency in the output of the entire FC system 12.

Figure 8:
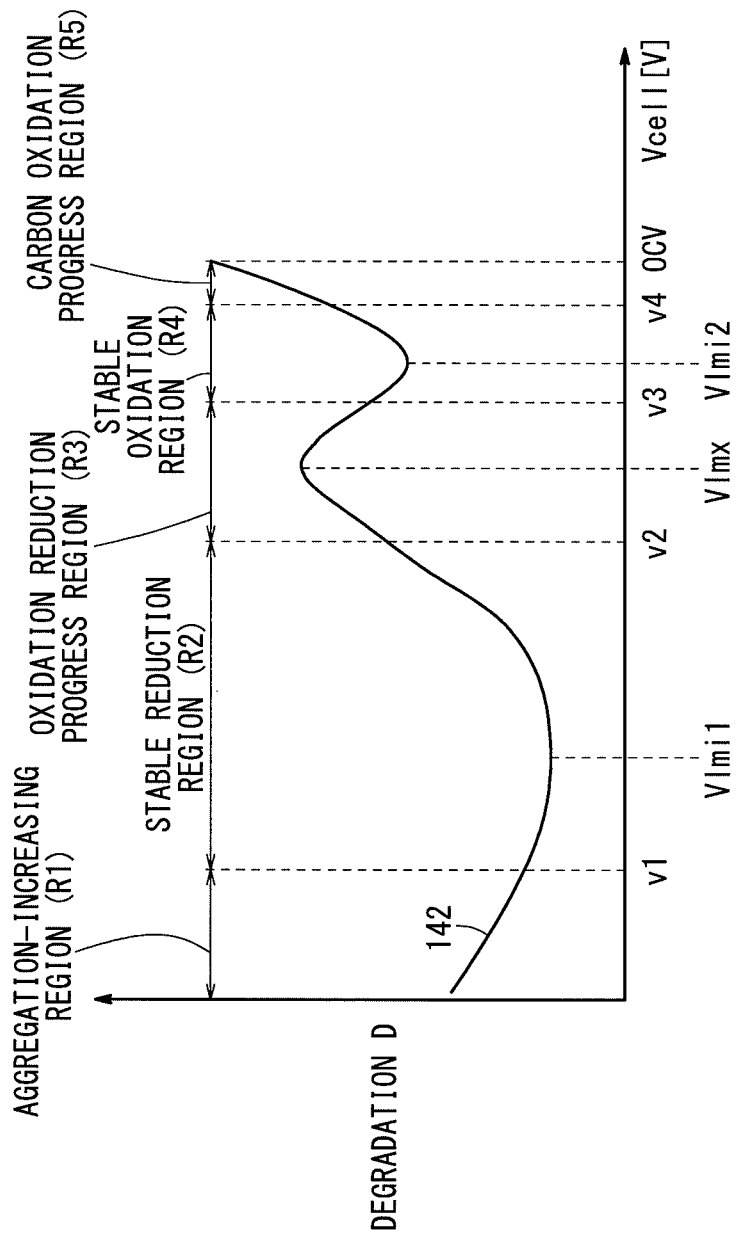
FIG. 8 is a graph showing an example of the relationship between the voltage of a fuel cell of a fuel cell stack and degradation of the fuel cell.

FIG. 8 shows an example of the relationship between the voltage of the FC cell of the FC stack 40 (cell voltage Vcell) [V] and the degradation D of the cell. That is, a curve (characteristic) 142 in FIG. 8 shows the relationship between the cell voltage Vcell and the degradation D.

In FIG. 8, in a region below the voltage v1 (e.g., 0.5 V), reduction reaction of platinum (oxidized platinum) in the FC cell proceeds severely, and aggregation of platinum occurs excessively (hereinafter referred to as the "platinum aggregation-increasing region R1" or the "aggregation-increasing region R1"). In a region from the voltage v1 to the voltage v2 (e.g., 0.8 V), reduction reaction proceeds stably (hereinafter referred to as the "stable platinum reduction region R2", or the "stable reduction region R2", or the "region R2 of a voltage range where catalyst reduction proceeds stably").

In a region from the voltage v2 to the voltage v3 (e.g. 0.9 V), oxidation-reduction reaction of platinum proceeds (hereinafter referred to as the "platinum oxidation reduction progress region R3" or the "oxidation reduction progress region R3"). In a region from the voltage v3 to the voltage v4 (e.g., 0.95 V), oxidation reaction of platinum proceeds stably (hereinafter referred to as the stable platinum oxidation region R4" or the "stable oxidation region R4"). In a region from the voltage v4 to OCV (open circuit voltage), oxidation of carbon in the FC cell proceeds (hereinafter referred to as the "carbon oxidation progress region R5").

As described above, in FIG. 8, if the cell voltage Vcell is in the stable platinum reduction region R2 or the stable platinum oxidation region R4, degradation of the FC cell occurs to a smaller extent. In contrast, if the cell voltage Vcell is in the platinum aggregation increasing region R1, the platinum oxidation reduction progress region R3, or the carbon oxidation progress region R5, degradation of the FC cell occurs to a greater extent.

In FIG. 8, on the face of it, the curve (characteristic) 142 is uniquely determined. However, in practice, the curve (characteristic) 142 varies depending on variation of the cell voltage Vcell (varying speed Acell) [V/sec] per unit time.

Figure 9:
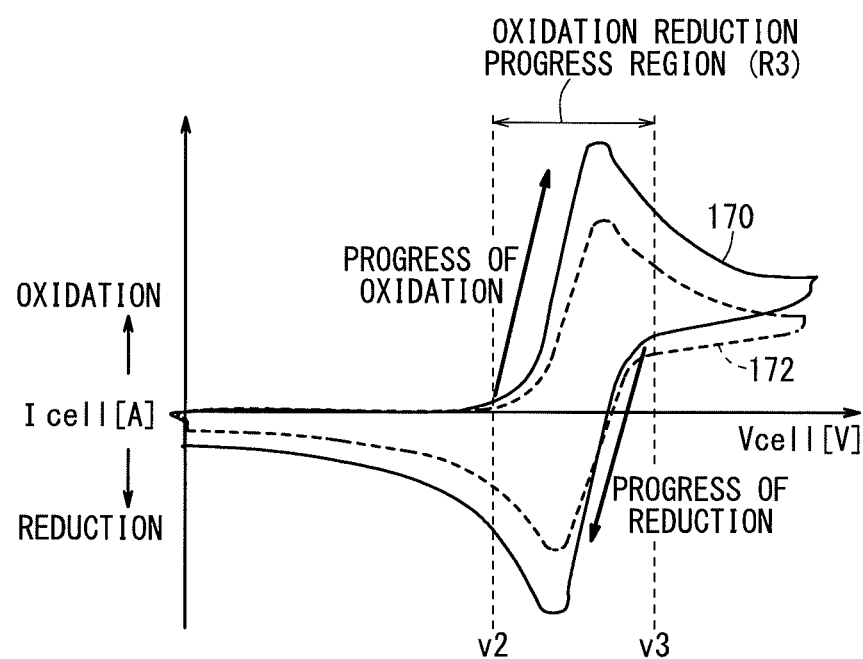
FIG. 9 is a cyclic voltammetry diagram showing an example of the progress of oxidation and the progress of reduction in the cases of different varying speeds in the voltage of the fuel cell.

FIG. 9 is a cyclic voltammetry diagram showing an example of the progress of oxidation and the progress of reduction in the cases of different varying speeds Acell. In FIG. 9, a solid curve 170 (characteristic) shows a case where the varying speed Acell is high, and a dotted curve 172 (characteristic) shows a case where the varying speed Acell is low. As can be seen from FIG. 9, since the degree of the progress in oxidation or reduction varies depending on the varying speed Acell, the voltages v1 to v4 cannot necessarily be determined uniquely. Further, the voltages v1 to v4 may change depending on the individual difference in the FC cell. Therefore, preferably, the voltages v1 to v4 should be set such that errors are reflected in the theoretical values, the simulation values, or the measured values.

Further, in the current-voltage (I-V) characteristic of the FC cell, as in the case of normal fuel cells, as the cell voltage Vcell decreases, the cell current Icell [A] is increased (see a I-V characteristic 162 indicated by "normal" in FIG. 10, and hereinafter referred to as "normal I-V characteristic"). Additionally, the power generation voltage (FC voltage Vfc) of the FC stack 40 is obtained by multiplying the cell voltage Vcell by the serial connection number Nfc in the FC stack 40. The serial connection number Nfc indicates the number of FC cells connected in series in the FC stack 40. The serial connection number Nfc is also simply referred to as the "cell number".

Figure 10:
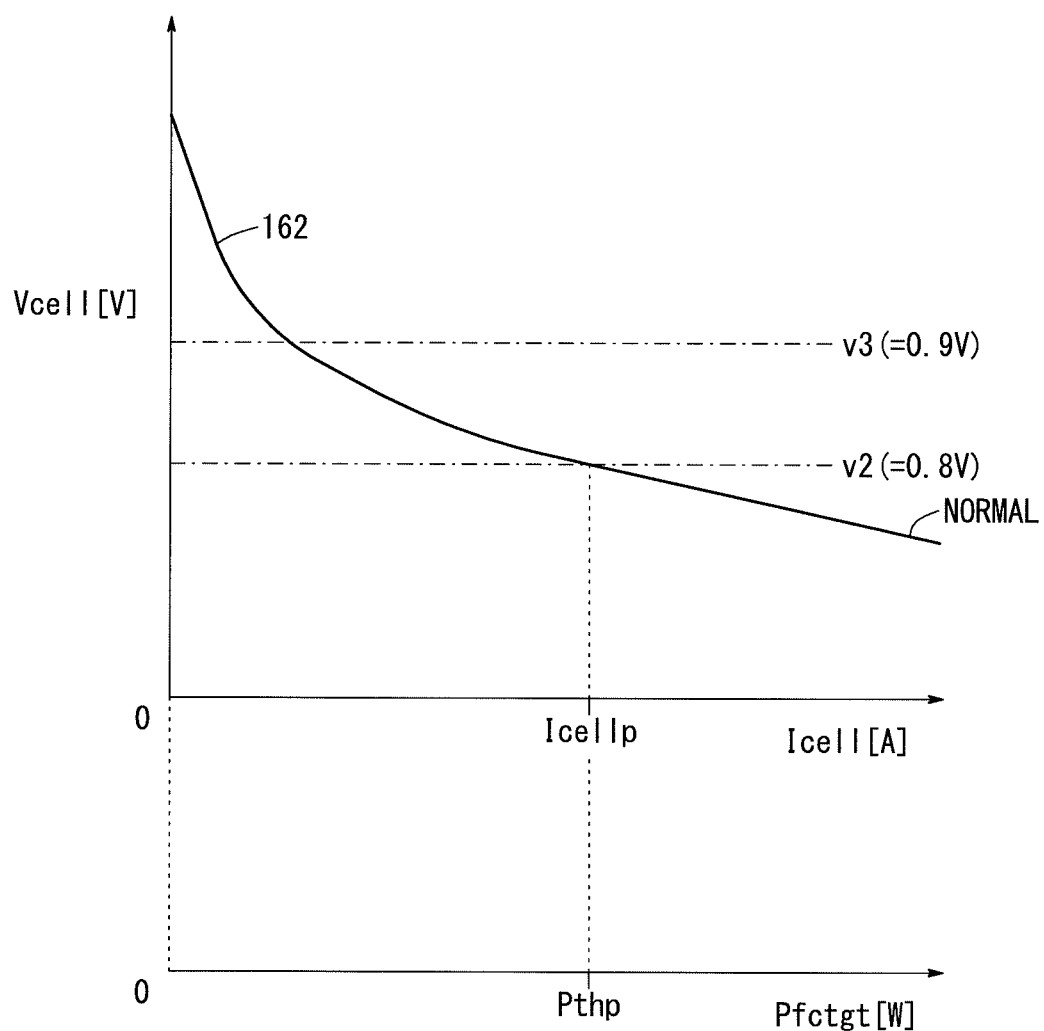
FIG. 10 is a graph showing a normal current-voltage characteristic of a fuel cell.

The normal I-V characteristic 162 in FIG. 10 is obtained when oxygen is in a rich state, i.e., the cathode stoichiometric ratio (which is nearly equal to oxygen concentration) is the normal stoichiometric ratio or more. Stated otherwise, when oxygen is in a rich state, the oxygen concentration is the normal oxygen concentration or more. The cathode stoichiometric ratio herein means (the flow rate of the air supplied to the cathode)/(the flow rate of the air consumed by power generation). In the present embodiment, the cathode stoichiometric ratio is also simply referred to as the stoichiometric ratio.

Figure 11:
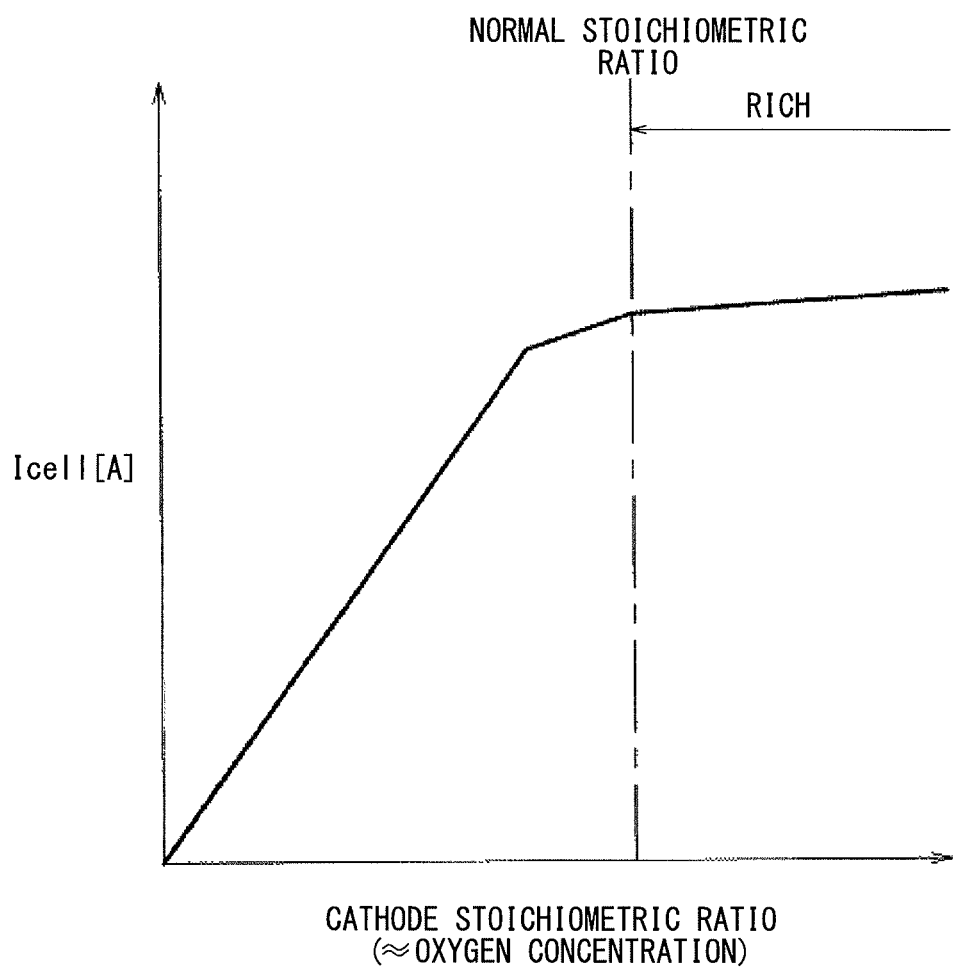
FIG. 11 is a graph showing the relationship between the cathode stoichiometric ratio and the cell current.

The expression "oxygen is in a rich state" means a state where, as shown in FIG. 11, even if the cathode stoichiometric ratio (which is nearly equal to oxygen concentration) is increased, the cell current Icell outputted from the unit cell is kept substantially at a constant level. In this state, oxygen is present in a region above the normal stoichiometric ratio, where oxygen is saturated.

The stoichiometric ratio of hydrogen should be understood in the same manner. That is, the anode stoichiometric ratio (which is nearly equal to hydrogen concentration) is represented by (the flow rate of the hydrogen supplied to the anode)/(the flow rate of the hydrogen consumed by power generation).

Figure 12:
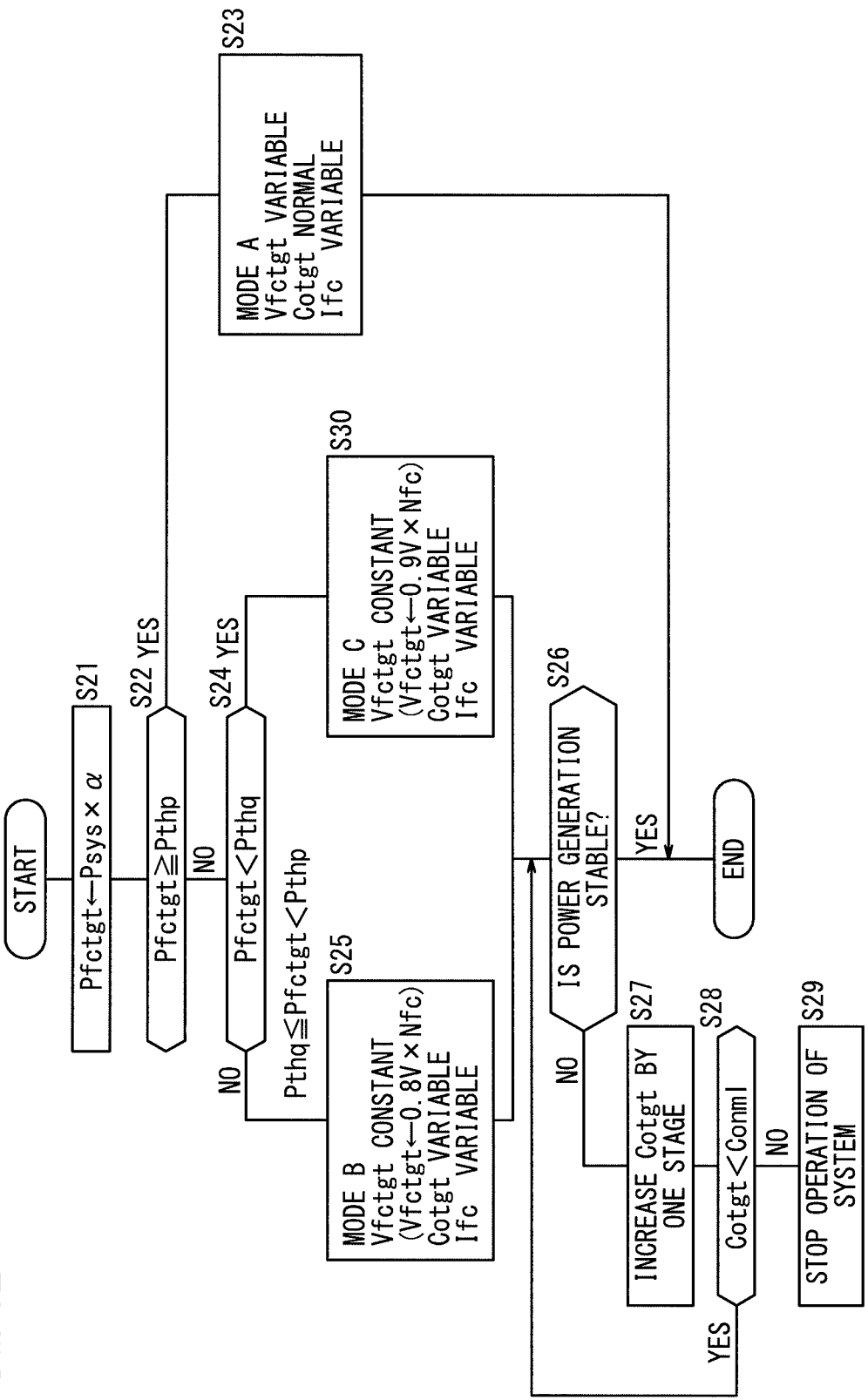
FIG. 12 is a flow chart illustrating a basic control mode according to energy management and power generation control of a fuel cell.

Next, in the energy management and the FC power generation control in steps S3 and S4, basic control (basic energy management·power generation control) will be described with reference to a flow chart in FIG. 12.

In step S21, the ECU 24 calculates the charging/discharging coefficient α, and multiplies the system load Psys calculated in step S16 by the calculated charging/discharging coefficient α to calculate target FC electric power (Pfctgt←Psys×α).

Figure 14:
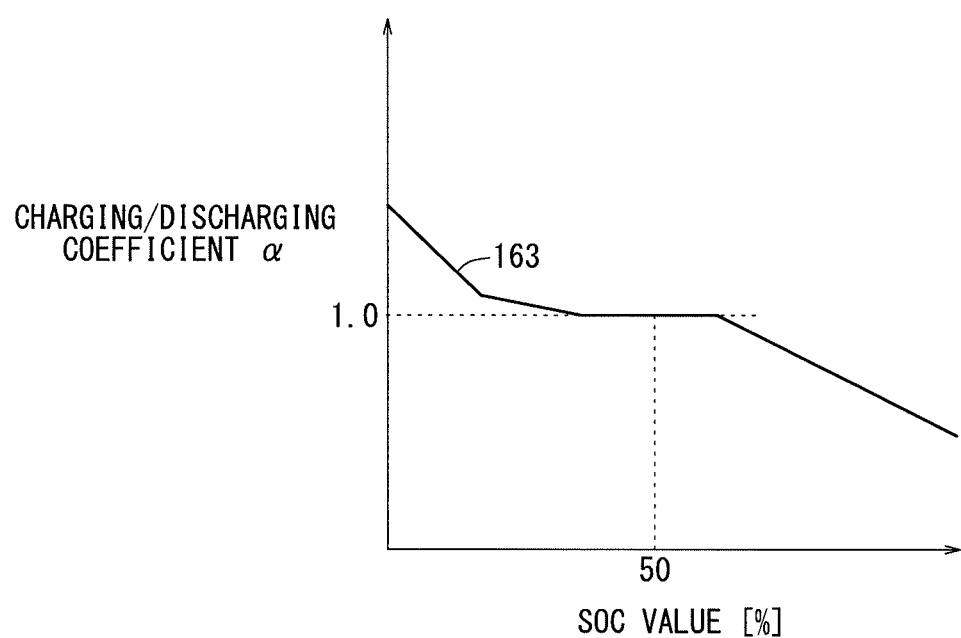
FIG. 14 is a graph showing the relationship between the SOC value of a battery and the charging/discharging coefficient.

The charging/discharging coefficient α herein is calculated based on the current SOC value inputted from the SOC sensor 104 and a characteristic (map) 163 in FIG. 14. For example, measured values, simulation values or the like may be used as the characteristic 163 in FIG. 14, and are stored in the ECU 24 in advance. In the embodiment, target SOC (target energy storage amount) of the battery 20 is 50 [%]. However, the present invention is not limited in this respect.

In the embodiment, as shown in FIG. 14, in a region where the SOC value is less than 50 [%] (when charging is required), the charging/discharging coefficient α is set to a value greater than "1". In this manner, power generation is performed excessively in the FC stack 40, and the excessive electric power is used for charging the battery 20. In a region where SOC value is greater than 50 [%] (when the battery 20 is in a sufficiently charged state), the charging/discharging coefficient α is set to a value less than "1". In this manner, shortage of electric power occurs in power generation of the FC stack 40, and electric power discharged from the battery 20 is utilized to compensate for the shortage of electric power.

For ease of understanding, in the following description, it is assumed that the charging/discharging coefficient α is 1 (Pfctgt=Psys).

In step S22, the ECU 24 determines whether or not the target power generation electric power (target FC electric power) Pfctgt calculated in step S21 is a threshold electric power Pthp or more (Pfctgt=Psys≥Pthp).

The threshold electric power Pthp herein means a fixed value obtained by multiplying the "cell voltage which is considered to cause no degradation of catalyst (0.8 V, switching voltage, predetermined voltage)", "the number of unit cells of the FC stack 40 (cell number Nfc)", and the "current value Icellp in the case where the cell voltage is 0.8 V in the normal I-V characteristic 162 of the FC stack 40 (see FIG. 10)". This threshold electric power Pthp can be calculated by the following expression (1). In FIG. 10, it should be noted that the axis of the target FC electric power Pfctgt is not linear.

$$Pthp=0.8 \text{ [V]} \times Nfc \times Icellp \quad (1)$$

In the case where the target FC electric power Pfctgt is the threshold electric power Pthp or more (S22: YES), in step S23, voltage variable/current variable control (mode A control) is implemented to obtain the target FC electric power Pfctgt.

This mode A control is mainly used when the target FC electric power Pfctgt is relatively high. In the state where the target oxygen concentration Cotgt is kept in a normal state (including the oxygen rich state), the target FC voltage Vfctgt is regulated by the DC/DC converter 22 thereby to control the FC current Ifc.

Figure 13:
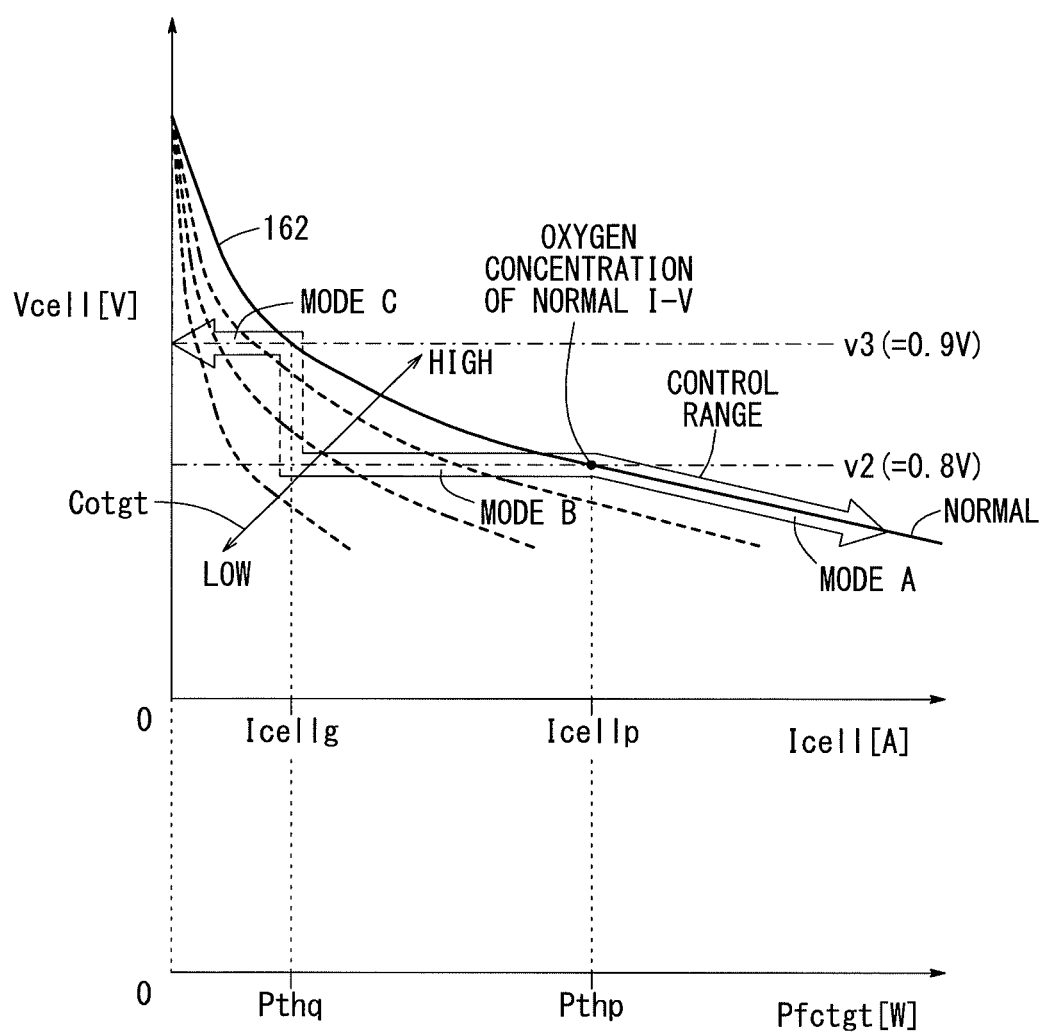
FIG. 13 is a graph showing a plurality of power supply modes (e.g., basic control mode) in the fuel cell.

That is, as shown in FIG. 13, in the mode A control implemented when the target FC electric power Pfctgt is the threshold electric power Pthp or more, the normal I-V characteristic 162 of the FC stack 40 (same as that shown in FIG. 10) is used. In the mode A control, the target FC current Ifctgt is calculated in correspondence with the target FC electric power Pfctgt. Further, the target FC voltage Vfctgt is calculated in correspondence with the target FC current Ifctgt. Then, the ECU 24 controls the DC/DC converter 22 such that the FC voltage Vfc is regulated to be the target FC voltage Vfctgt. That is, the FC voltage Vfc is controlled to control the FC current Ifc by increasing (stepping up) the primary voltage V1 by the DC/DC converter 22 such that the second voltage V2 is regulated to be the target FC voltage Vfctgt.

In the mode A control as described above, even if the target FC electric power Pfctgt is the threshold electric power Pthp or more, i.e., the system load Psys is high, the secondary voltage V2 (FC voltage Vfc) is changed by the DC/DC converter 22 according to the normal I-V characteristic 162 in correspondence with the target FC electric power Pfctgt, whereby basically the system load Psys can be covered by the FC electric power Pfc.

In the determination in step S22, if the target FC electric power Pfctgt is less than the threshold electric power Pthp (step S22: NO), then in step S24, it is determined whether or not the target FC electric power Pfctgt calculated in step S21 is less than the threshold electric power Pthq (Pfctgt<Pthq). For example, the threshold electric power Pthq corresponding to the cell voltage of 0.9[V] (Vcell=0.9[V]) is determined. Therefore, the threshold electric power Pthq is smaller than the threshold electric power Pthp (Pthq<Pthp, see FIG. 13).

In the case where the determination in step S24 is negative, i.e., in the case where the target FC electric power Pfctgt is less than the threshold electric power Pthp, and equal to or more than the threshold electric power Pthq (step S24: NO, Pthq≤Pfctgt<Pthp), in step S25, voltage fixed/stoichiometric ratio variable current variable control (mode B control) is implemented. It should be noted that the voltage fixed/stoichiometric ratio variable current variable control of the mode B control is implemented in the same manner as in mode C control, mode D control and mode E control to be described later. In contrast with the voltage variable/current variable control in the mode A control as described above, the mode B control is common to the mode C control, mode D control and the mode E control in respect of the voltage fixed/stoichiometric ratio variable current variable control. Therefore, this control is also referred to as the CVVC (Constant Voltage Variable Current) control.

The mode B control is mainly used when the system load Psys is relatively medium. In the state where the target cell voltage Vcelltgt (=target FC voltage Vfctgt/cell number Nfc) is fixed to the reference voltage (in the present embodiment, voltage v2 (=0.8 V)) which is set to be equal to or less than the voltage below the oxidation reduction progress region R3, the target oxygen concentration is variable, and thus, the FC current Ifc is variable.

That is, as shown in FIG. 13, in the mode B control, in the range between the threshold electric power Pthq and the threshold electric power Pthp, the cell voltage Vcell is kept at a constant level (Vcell=v2). In this state, the target oxygen concentration Cotgt is decreased thereby to decrease the oxygen concentration Co.

As shown in FIG. 11, as the cathode stoichiometric ratio (which is nearly equal to the oxygen concentration Co) decreases, the cell current Icell (FC current Ifc) is accordingly decreased. Therefore, in the state where the cell voltage Vcell is kept at a constant level (Vcell=v2=0.8 V), by increasing or decreasing the target oxygen concentration Cotgt, it becomes possible to control the cell current Icell (FC current Ifc) and the FC electric power Pfc. The shortage of the FC electric power Pfc is assisted by the battery 20.

Figure 15:
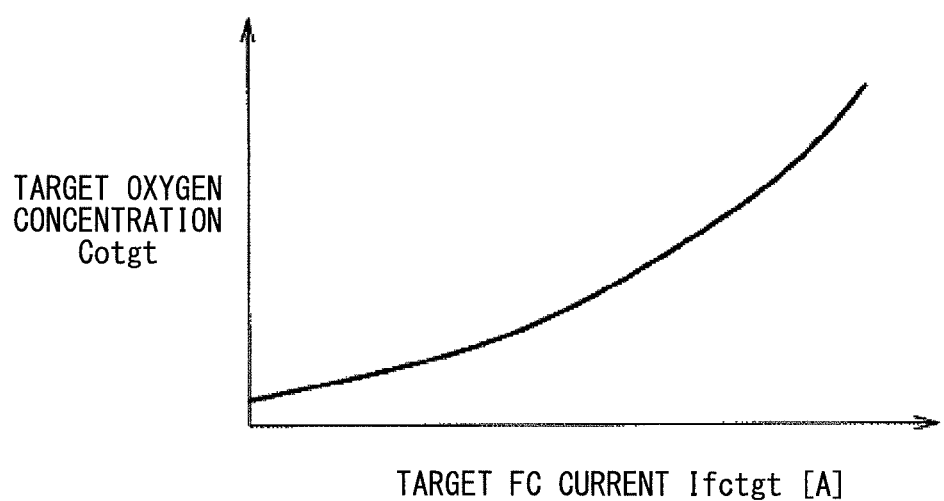
FIG. 15 is a graph showing the relationship between the target FC current and the target oxygen concentration.

In this case, the ECU 24 regulates the step up voltage ratio of the DC/DC converter 22 thereby to fix the target FC voltage Vfctgt at the reference voltage (in the present embodiment, the voltage v2 (=0.8 V)) which is set to be equal to or less than the voltage below the oxidation reduction progress region R3, and calculates the target FC current Ifctgt in correspondence with the target FC electric power Pfctgt. Further, the ECU 24 calculates the target oxygen concentration Cotgt in correspondence with the target FC current Ifctgt on the premise that the target FC voltage Vfctgt is at the reference voltage (see FIGS. 11 and 15). FIG. 15 shows the relationship between the target FC current Ifctgt and the target oxygen concentration Cotgt when the FC voltage Vfc is at the reference voltage v2.

At this time, depending on the target oxygen concentration Cotgt, the ECU 24 calculates, and sends instruction values to the respective components. The instruction values herein include the rotation number of the air pump 60 (hereinafter referred to as the "air pump rotation number Nap" or the "rotation number Nap"), the rotation number of the water pump 80 (hereinafter referred to as the "water pump rotation number Nwp" or the "rotation number Nwp"), and the opening degree of the back pressure valve 64 (hereinafter referred to as the "back pressure valve opening degree θbp" or the "opening degree θbp").

Figure 16:
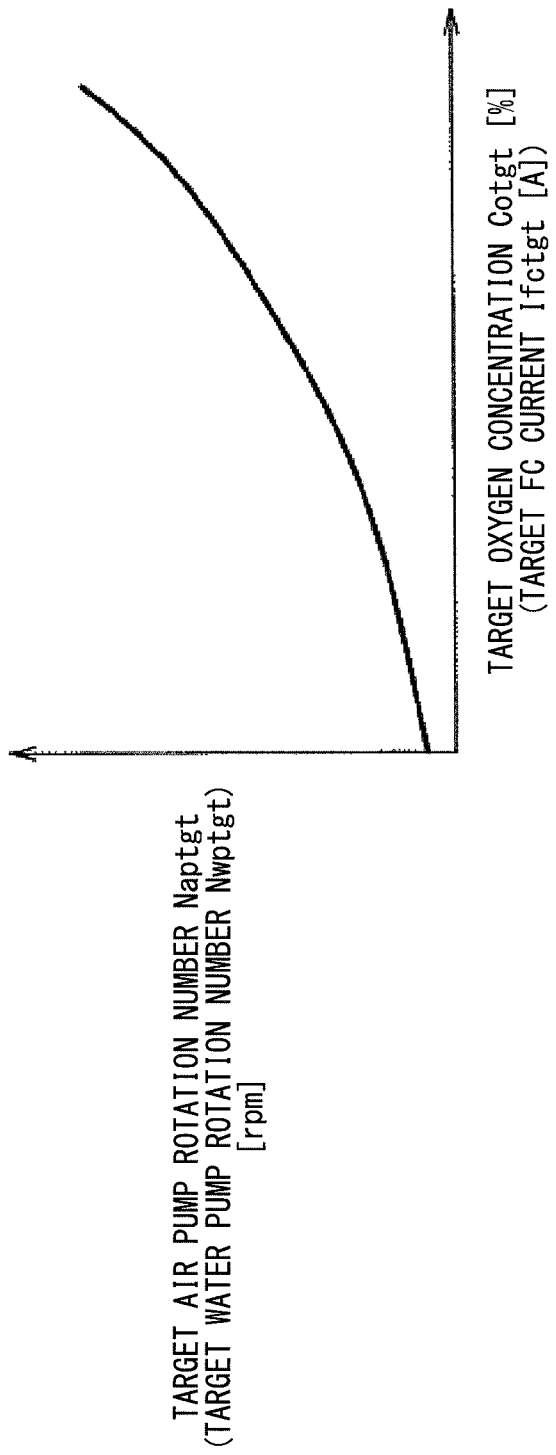
FIG. 16 is a graph showing the relationship between the target FC current, and the target air pump rotation number and the target water pump rotation number.
Figure 17:
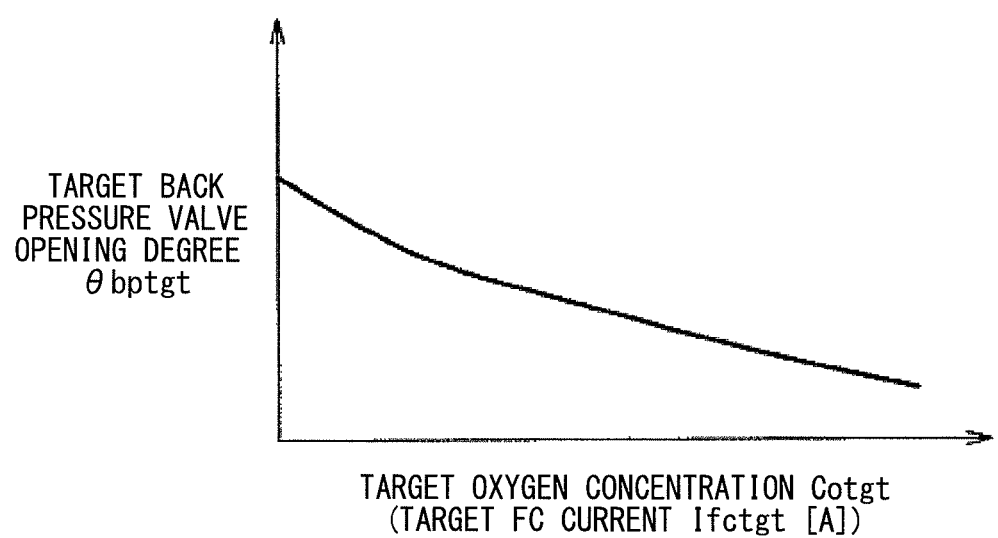
FIG. 17 is a graph showing the relationship between the target FC current, and the target opening degree of a back pressure valve.

That is, as shown in FIGS. 16 and 17, the target air pump rotation number Naptgt, the target water pump rotation number Nwptgt, and the target back pressure valve opening degree θbptgt are determined depending on the target oxygen concentration Cotgt.

In this manner, the mode B control in step S25 is implemented.

Then, in step S26, the ECU 24 determines whether power generation by the FC stack 40 is stably performed or not. In the determination, if the lowest cell voltage inputted from the cell voltage monitor 42 is lower than the voltage obtained by subtracting a predetermined voltage from the average cell voltage (lowest cell voltage<(average cell voltage−predetermined voltage)), the ECU 24 determines that power generation of the FC stack 40 is not stable. For example, measured values, simulation values or the like may be used as the predetermined voltage.

If power generation is stable (S26: YES), the current process is finished. If power generation is not stable (S26: NO), then in step S27, the ECU 24 increases the target oxygen concentration Cotgt by one stage (closer to normal concentration). Specifically, at least one of the control to increase the rotation number Nap of the air pump 60 and the control to decrease the opening degree θbp of the back pressure valve 64 is performed by one stage.

In step S28, the ECU 24 determines whether or not the target oxygen concentration Cotgt is less than the target oxygen concentration of the normal I-V characteristic (normal oxygen concentration Conml). If the target oxygen concentration Cotgt is less than the normal oxygen concentration Conml (S28: YES), the process returns to step S26. If the target oxygen concentration Cotgt is not less than the normal oxygen concentration Conml (S28: NO), in step S29, the ECU 24 stops operation of the FC unit 18. That is, the ECU 24 stops supply of hydrogen and air to the FC stack 40 thereby to stop power generation of the FC stack 40. Then, the ECU 24 turns on an alarming lamp (not shown) to notify the operator that there is a failure in the FC stack 40. It should be noted that the ECU 24 supplies electric power from the battery 20 to the motor 14 for allowing the FC vehicle 10 to continue running.

In the determination in step S24 as described above, if the target FC electric power Pfctgt is less than the threshold electric power Pthq (step S24:YES), mode C control is implemented in step S30. As shown in FIG. 13, the mode C control is mainly used when the target FC electric power Pfctgt is relatively low. The target cell voltage Vcelltgt (=target FC voltage Vfctgt/cell number) is fixed to the voltage (in the present embodiment, the voltage v3 (=0.9 V)) outside the oxidation reduction progress region R3, and the FC current Ifc is variable. The shortage of the FC electric power Pfc is assisted by the battery 20, and excessive electric power of the FC electric power Pfc is used for charging the battery 20.

In the mode C control, as shown in FIG. 13, the cell voltage Vcell is fixed to a constant level (Vcell=v3). In this state, the target oxygen concentration Cotgt is decreased thereby to decrease the oxygen concentration Co.

As shown in FIG. 11, as the cathode stoichiometric ratio (which is nearly equal to the oxygen concentration Co) decreases, the cell current Icell (FC current Ifc) is decreased. Thus, by increasing or decreasing the target oxygen concentration Cotgt while keeping the cell voltage Vcell at a constant level (Vcell=v3=0.9 V), it becomes possible to control the cell current Icell (FC current Ifc) and the FC electric power Pfc. The shortage of the FC electric power Pfc is assisted by the battery 20. Therefore, in the mode C control, the process in the same manner as the control process in the mode B control in step S25 as described above, and the process related to power generation stability in steps S26 to S29 are performed.

In this manner, basic control according to energy management and FC power generation control of steps S3 and S4 is implemented.

Figure 18:
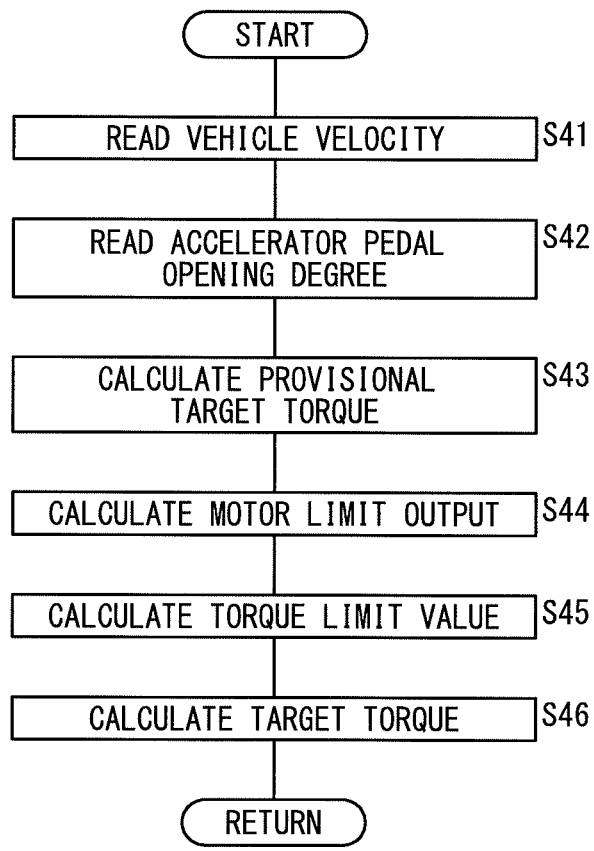
FIG. 18 is a flow chart showing torque control of the motor.

Next, FIG. 18 is a flow chart showing torque control of the motor 14 related to the process of step S5. In step S41, the ECU 24 reads vehicle velocity Vs from the vehicle velocity sensor 154. In step S42, the ECU 24 reads the opening degree θp of the accelerator pedal 156 from the opening degree sensor 150.

In step S43, the ECU 24 calculates a provisional target torque Ttgt_p [N·m] of the motor 14 based on the vehicle velocity Vs and the opening degree θp. Specifically, a map representative of the relationship between the vehicle velocity Vs, the opening degree θp, and the provisional target torque Ttgt_p is stored in a memory (not shown), and the target provisional torque Ttgt_p is calculated based on the map, the vehicle velocity Vs, and the opening degree θp.

In step S44, the ECU 24 determines whether or not the motor 14 is regenerating electric power. If the motor 14 is not regenerating electric power, the ECU 24 calculates the limit output of the motor 14 (motor limit output Pm_lim) [W]. The motor limit output Pm_lim is equal to the limit value of electric power (limit supply electric power Ps_lim) [W] which can be supplied from the FC system 12 to the motor 14. Specifically, the limit supply electric power Ps_lim and the motor limit output Pm_lim are calculated by subtracting electric power Pa consumed by auxiliary devices from the sum of the FC electric power Pfc from the FC stack 40 and the limit value (limit output Pbat_lim) of electric power which can be supplied from the battery 20 (Pm_lim=Ps_lim←Pfc+Pbat_lim−Pa).

In step S45, the ECU 24 calculates the torque limit value Tlim [N·m] of the motor 14. Specifically, the torque limit value Tlim is calculated by dividing the motor limit output Pm_lim by the vehicle velocity Vs (Tlim←Pm_lim/Vs).

In step S44, if the ECU 24 determines that the motor 14 is regenerating electric power, the ECU 24 calculates limit supply regenerative electric power Ps_reglim. The limit supply regenerative electric power Ps_reglim is calculated by subtracting electric power Pa consumed by the auxiliary devices from the sum of a limit value of electric power with which the battery 20 can be charged (charging limit Pbat_chglim) and the FC electric power Pfc from the FC stack 40 (Ps_reglim=Pbat_chglim+Pfc−Pa). If the motor 14 is regenerating electric power, in step S45, the ECU 24 calculates the regeneration torque limit value Treglim [N·m] of the motor 14. Specifically, the torque limit value Tlim is calculated by dividing the limit supply regenerative electric power Ps_reglim by the vehicle velocity Vs (Tlim←Ps_reglim/Vs).

In step S46, the ECU 24 calculates the target torque Ttgt [N·m]. Specifically, the ECU 24 calculates the target torque Ttgt by setting a limitation of the torque limit value Tlim to the provisional target torque Ttgt_p. For example, in the case where the provisional target torque Ttgt_p is the torque limit value Tlim or less, (Ttgt_p≤Tlim), the provisional target torque Ttgt_p is directly used as the target torque Ttgt (Ttgt←Ttgt_p). In the case where the provisional target torque Ttgt_p exceeds the torque limit value Tlim (Ttgt_p>Tlim), the torque limit value Tlim is used as the target torque Ttgt (Ttgt←Tlim). The calculated target torque Ttgt is used to control the motor 14.

Figure 19:
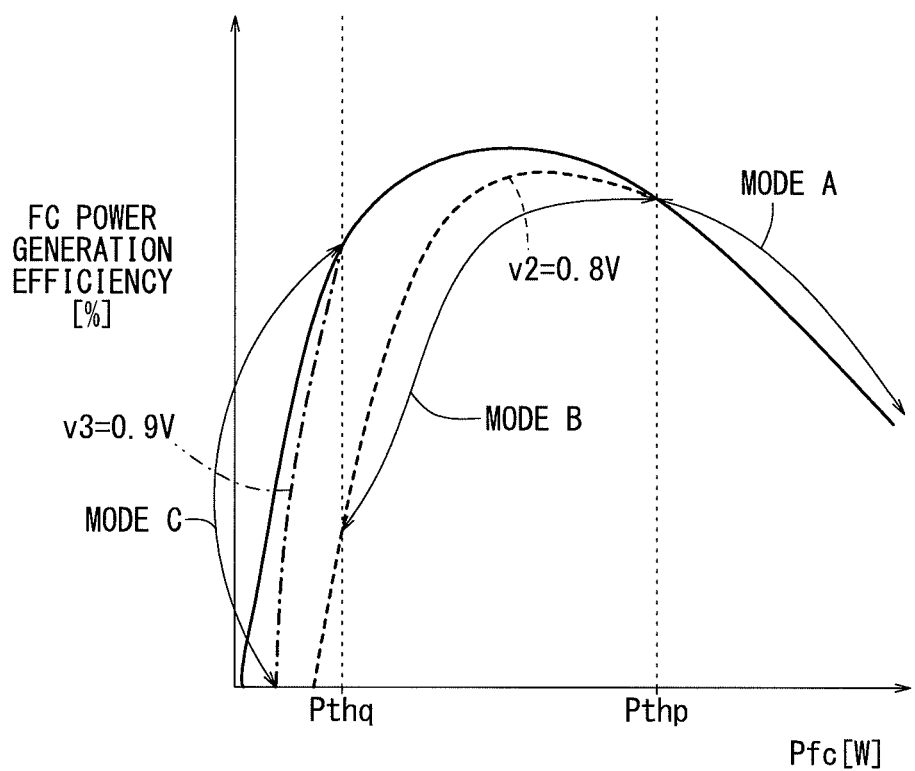
FIG. 19 is a graph showing the relationship between the power generation electric power and the power generation efficiency of the fuel cell.

FIG. 19 shows the relationship between the FC electric power Pfc, and the power generation efficiency of the FC stack 40 in the mode A control, mode B control, and mode C control according to the above described power supply mode. As can be seen from FIG. 19, in the mode A control, basically, the entire system load Psys is covered by the FC electric power Pfc, and the high power generation efficiency of the FC stack 40 is maintained. In the mode B control where the voltage is fixed to v2, the stoichiometric ratio (oxygen concentration) is low and variable, basically, by covering the entire system load Psys by the FC electric power Pfc, charging/discharging of the battery 20 occurs less frequently, and it is possible to improve the output efficiency in the entire FC system 12. In the mode C control, the system load Psys is covered by the FC electric power Pfc and the battery electric power Pbat.

Figure 20:
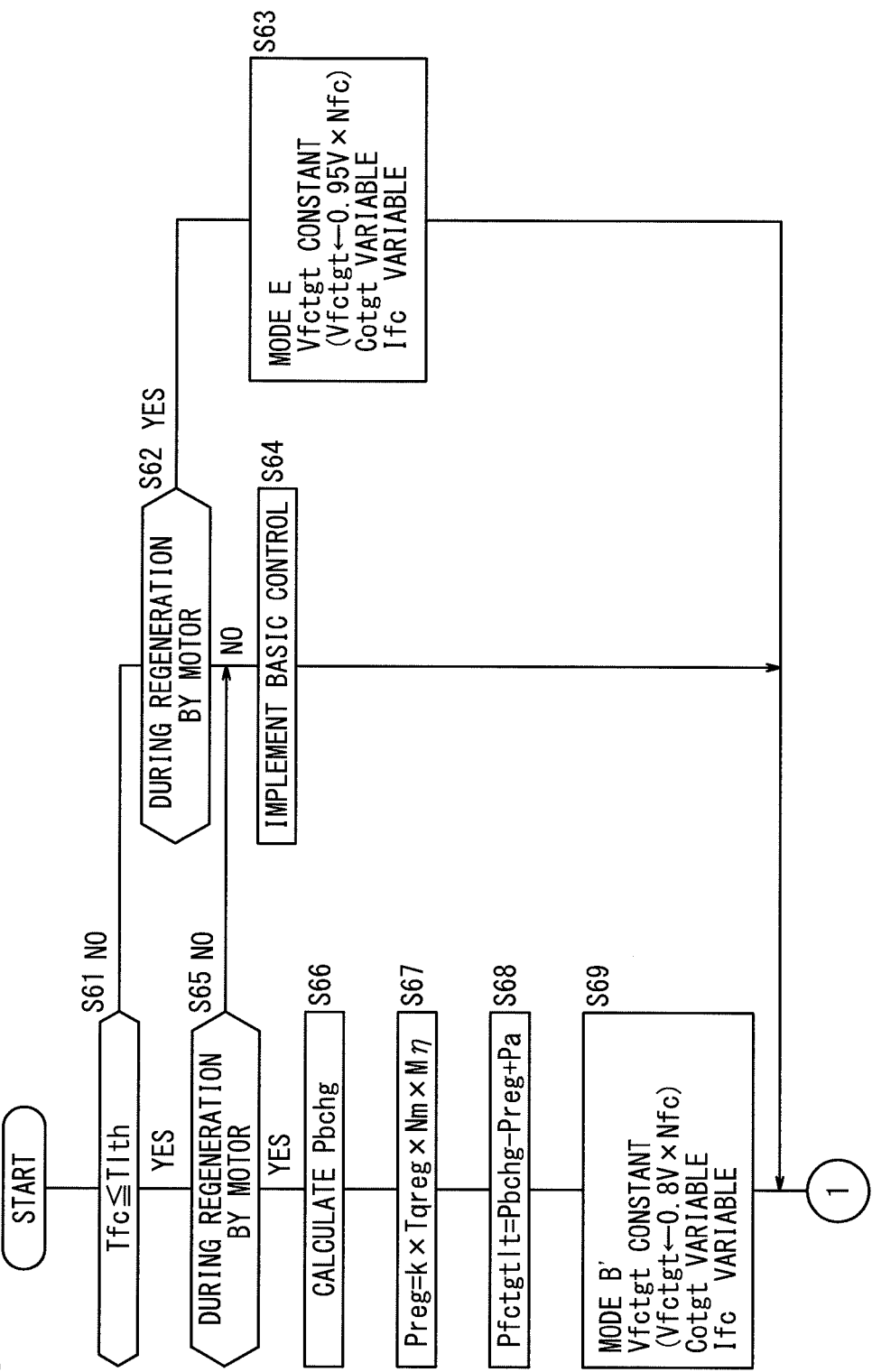
FIG. 20 is a flow chart (1) illustrating energy management and power generation control based on the premise of the basic control modes of FIG. 12.

Next, a process of the energy management/power generation control according to first and second embodiments based on the premise of the above described basic control modes (mode A control, mode B control, and mode C control) will be described with reference to flow charts in FIGS. 20 and 21.

First Embodiment

In step S61, it is determined whether or not the temperature Tfc of the FC stack 40 is low (it is determined whether or not the temperature Tfc of the FC stack 40 is equal to or smaller than a low temperature determination threshold Tlth of, for example, 5[° C.] or 10[° C.]). In this determination, instead of the temperature Tfc of the FC stack 40, the outlet temperature of the coolant (temperature of the coolant flowing through the pipe 82a in FIG. 3) or the outlet temperature of the cathode off gas of the FC stack 40 (temperature of the cathode off gas flowing through the pipe 62b in FIG. 3), or the outlet temperature of the anode off gas of the FC stack 40 (temperature of the anode off gas flowing through the pipe 48b in FIG. 3) may be used. In this first embodiment and a second embodiment described next, the temperature measured by the temperature sensor 72 for detecting the temperature of the cathode off gas is regarded as the temperature Tfc of the FC stack 40.

If the temperature Tfc of the FC stack 40 is not low (Tfc>Tlth), in step S62, it is determined whether or not the motor 14 is regenerating electric power.

If the motor 14 is regenerating electric power (step S62: YES), the mode E control (CVVC control) in step S63 as described later in detail is implemented. If the motor 14 is not regenerating electric power (step S62: NO), in step S64, basic control as described above with reference to a flow chart in FIG. 12 is implemented.

Now, the significance of adopting the mode E control in step S63 will be described. In the mode B control and mode C control (the mode B and C controls are CVVC control) except the mode A control (the mode A control is not CVVC control, but normal control), the voltage of the FC stack 40 is fixed to the voltage v2=0.8 V or v3=0.9 V outside the oxidation reduction progress region R3 by the DC/DC converter 22, and the stoichiometric ratio is placed in a low oxygen stoichiometric ratio variable condition where the stoichiometric ratio is smaller than the normal stoichiometric ratio, and then control is performed on the FC electrical current Ifc, and thus the FC electric power Pfc.

Further, during the above basic control modes (modes A, B, and C), for example, at the time of deceleration of the vehicle velocity Vs of the FC vehicle 10 shown in FIG. 1, the motor 14 is operated as a power generator, and electrical current (regenerative electrical current) produced at the three phase coils of the motor 14 flows into the secondary side 2S of the DC/DC converter 22 through the inverter 16.

At this time, the voltage V2 on the secondary side 2S (secondary voltage) is determined and controlled by the DC/DC converter 22 through the ECU 24. The ECU 24 can detect whether the flowing electrical current is regenerative electrical current or power running electrical current by detecting the flow direction of the electrical current flowing through each phase of the motor 14.

The motor 14 adopts a permanent magnet synchronous motor, which is a brushless motor. The magnitude of the regenerative electric power Preg is basically determined based on the magnitude of the magnetic field and the rotation number of the motor 14.

The phase-to-phase voltage of the motor 14 (referred to as the "motor voltage Vm") is the secondary voltage V2 (Vm=V2). Therefore, it should be noted that as the secondary voltage V2 is set be higher by the DC/DC converter 22, the value of the regenerative electrical current becomes smaller.

Figure 22:
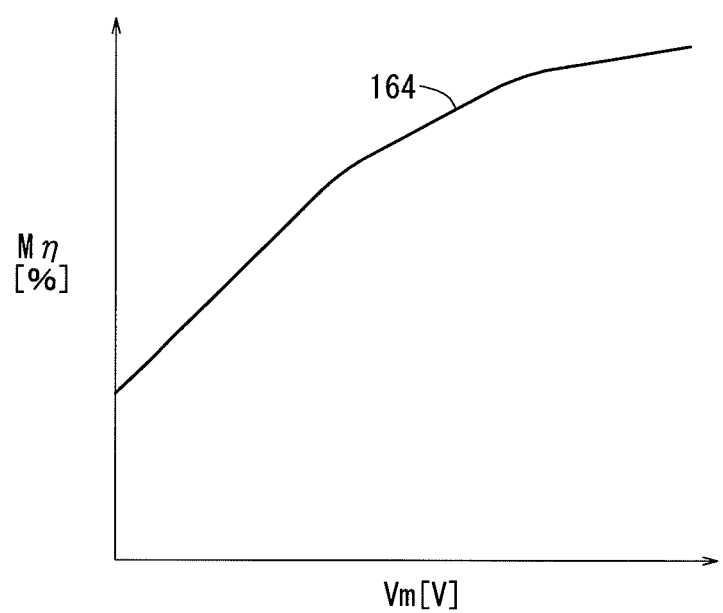
FIG. 22 is a graph showing the relationship between the motor voltage and the motor efficiency.

FIG. 22 shows a characteristic 164 of the efficiency of the motor 14 at the time of regeneration of electric power of the motor 14 (referred to as the motor efficiency $M\eta$ [%]). According to the characteristic 164, as the motor voltage Vm becomes large, the value of the regenerative electrical current becomes small. Therefore, iron and copper losses become small, and the motor efficiency $M\eta$ [%] becomes high.

Excessive regenerative electric power is supplied to the battery 20 through the DC/DC converter 22 to charge the battery 20.

Figure 23:
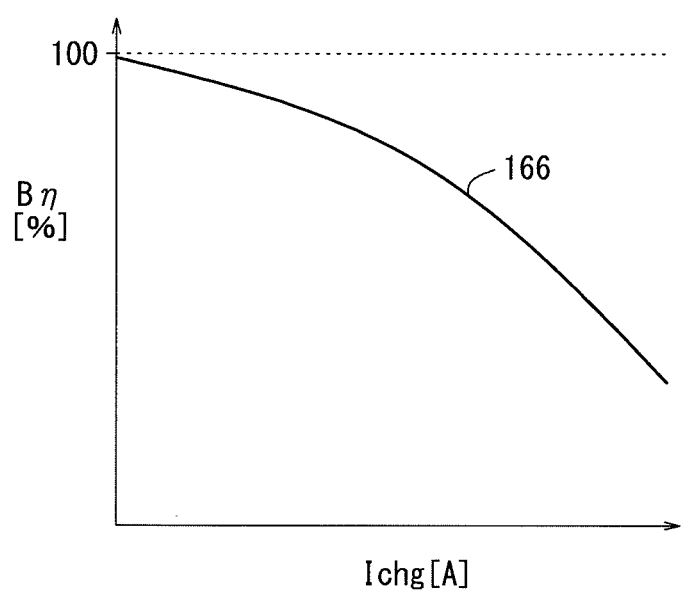
FIG. 23 is a graph showing the relationship between the charging current and the charging efficiency.

FIG. 23 shows a characteristic 166 of the charging efficiency $B\eta$ of the battery 20. According to the characteristic 166, as the charging current Ichg [A] becomes large, the loss resulting from the internal resistance of the battery 20 becomes large in proportional to the square of the charging current Ichg, and thus, the charging efficiency $B\eta$ is decreased.

If it is determined in step S62 that the motor 14 is regenerating electric power, i.e., if the motor 14 is regenerating electric power when the FC stack 40 is not at a low temperature (step S62: YES), the mode E control (CVVC control) is performed in step S63. That is, in the mode E control (CVVC control), the DC/DC converter 22 fixes the cell voltage Vcell of the FC stack 40 to the voltage Vlmi2 (e.g., Vlmi=0.95 [V]) where degradation D in the stable oxidation region R4 in FIG. 8 is the smallest, and power generation is performed at a stoichiometric ratio lower than the normal stoichiometric ratio such that the FC current Ifc, which is the electrical current outputted from the FC stack 40, is reduced by the amount of regenerative electrical current. (Alternatively, mode C control, as shown in FIG. 13, for fixing the cell voltage Vcell to v3 (Vcell=v3) may be implemented.)

As described above, during regeneration of electric power at the time the temperature is not low, by increasing the FC voltage Vfc of the FC stack 40, the motor voltage Vm of the motor 14 is increased, and the motor efficiency $M\eta$ is improved. In this manner, the energy loss of the regenerative electric power Preg is reduced. Further, since the stoichiometric ratio is decreased to thereby prevent the charging current by the regenerative electrical current from being increased, improvement in the charging efficiency $B\eta$ of the battery 20 is achieved accordingly.

In the mode E control, the power generation is performed under a low oxygen condition at variable stoichiometric ratio and fixed voltage in the stable oxidation region R4 where the cell voltage Vcell is high. As can be seen from FIG. 8, in terms of the degradation D, preferably, Vcell=Vlmi2, and in terms of the efficiency, preferably, the cell voltage Vcell has a higher voltage of v4 (Vcell=v4). Therefore, in the mode E control where voltage is fixed, the stoichiometric ratio is variable and the electric current is variable (CVVC control), the cell voltage Vcell is fixed to any voltage between v3 and v4 (v3<Vcell≤v4).

Figure 24:
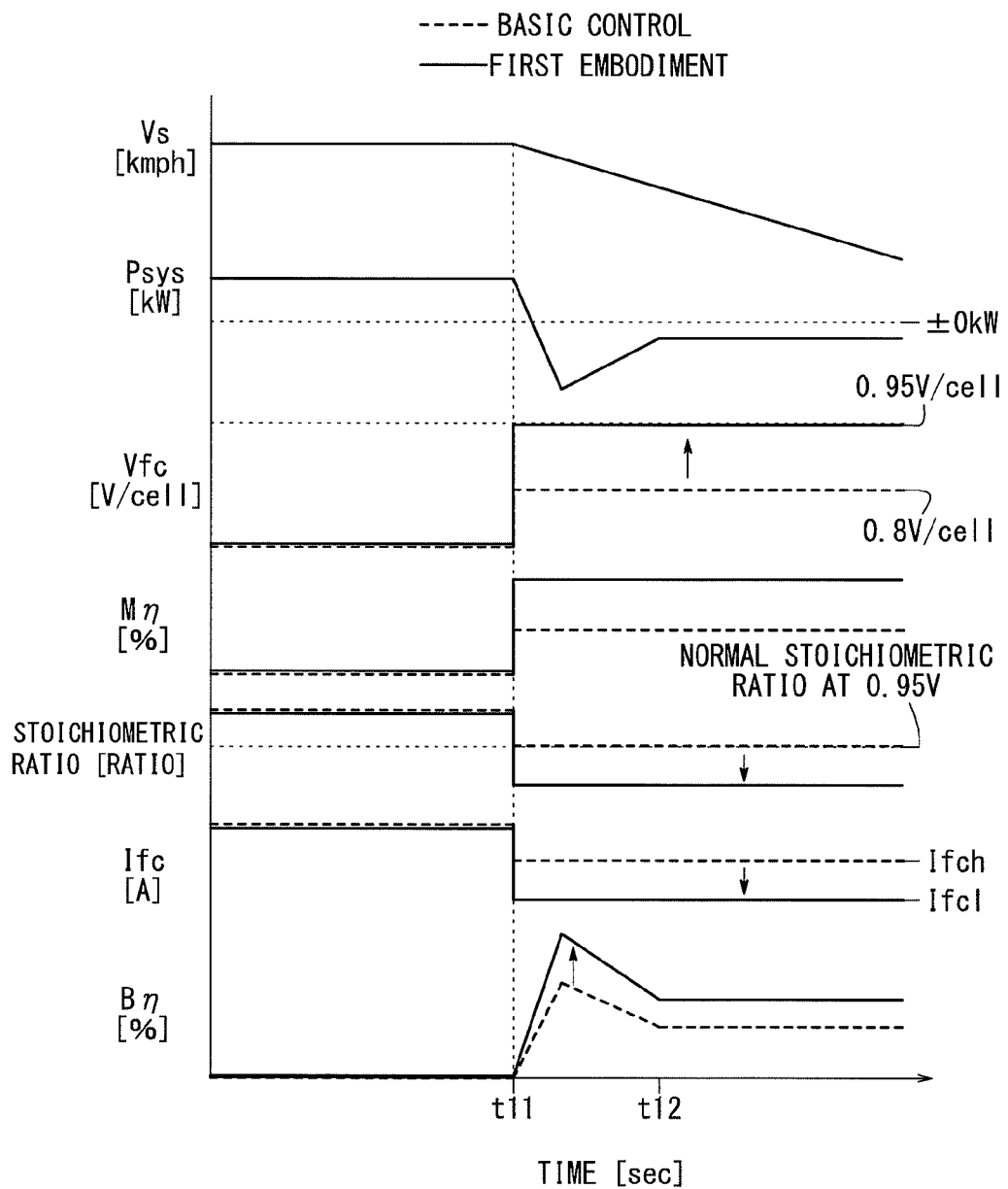
FIG. 24 is a time chart illustrating a technique of a first embodiment in comparison with a basic control.

FIG. 24 is a time chart in the case where it is determined that the motor 14 is regenerating electric power at time t11. In portions of the time chart drawn below the chart of Vfc [V/cell], bold broken lines represent change characteristics of the basic control, and bold solid lines represent change characteristics of the first embodiment.

At time t11, when deceleration of the vehicle velocity Vs is started, regeneration of electric power is started. Thus, the FC voltage Vfc [V/cell] is increased from 0.8 [V/cell] to 0.95 [V/cell], and at the same time, the stoichiometric ratio is decreased from the normal stoichiometric ratio (point on the normal I-V characteristic 162 of FIG. 10) at 0.95[V] to the low stoichiometric ratio where the FC current Ifc is decreased from the FC current Ifch to the FC current Ifcl. It can be understood that improvement in both of the motor efficiency $M\eta$ and the charging efficiency $B\eta$ is achieved.

During control in transition from around time t11 to time t12, the value of the system load Psys is stabilized, and during deceleration at the constant rate from time t12, the system load Psys has a fixed negative value (during regeneration of electric power).

Summary of the First Invention

As described above, the fuel cell vehicle 10 according to the first embodiment includes the FC stack 40, the gas supply unit (fuel gas supply unit (hydrogen tank 44), oxygen-containing gas supply unit (air pump 60)), the DC/DC converter 22 (voltage regulator unit), the motor 14 (drive motor), the battery 20 (energy storage device), and the ECU 24 (control unit). A first gas containing oxygen and a second gas containing hydrogen are supplied to the FC stack 40, and reactions of these gases are induced by the catalyst to perform power generation by the FC stack 40. The gas supply unit supplies at least one of the first gas and the second gas to the FC stack 40. The DC/DC converter 22 regulates the FC voltage Vfc of the FC stack 40. The motor 14 is a load driven by the electric power outputted from the FC stack 40. The battery 20 stores electric power regenerated by the motor 14. The ECU 24 controls the FC stack 40, the gas supply unit, the DC/DC converter 22, the motor 14, and the battery 20.

At the time of regeneration of electric power by the motor 14, in the state where the FC voltage Vfc of the FC stack 40 is fixed within a predetermined voltage range (voltage range of the stable oxidation region R4 between v3 and v4) outside the oxidation reduction progress voltage range (oxidation reduction progress region R3) of the FC stack 40 by the DC/DC converter 22 (e.g., the FC voltage Vfc is fixed at v3 or Vlmi2 (Vfc=v3 or Vfc=Vlmi2)), the ECU 24 decreases the oxygen concentration or hydrogen concentration by the gas supply unit to thereby decrease the FC electric power Pfc of the FC stack 40.

In this manner, in the state where the voltage of the FC stack 40 is fixed to a voltage outside the oxidation reduction progress voltage range (oxidation reduction progress region R3) of the FC stack 40 by the DC/DC converter 22, the oxygen concentration or the hydrogen concentration is decreased by the gas supply unit to decrease the electric power outputted from the FC stack 40, and thus degradation of the FC stack 40 is suppressed (see FIG. 8). In the state where the degradation is suppressed, the regenerative electric power Preg obtained by regeneration is collected into the battery 20. Therefore, when the electric power outputted from the FC stack 40 is decreased, the regenerative electric power Preg can be accordingly collected efficiently. Thus, improvement in the efficiency of collecting the regenerative electric power Preg (regeneration efficiency) is achieved while suppressing degradation of the FC stack 40. Consequently, it is possible to improve the system efficiency. Further, the amount of supplied oxygen or hydrogen can be reduced. The amount of hydrogen used in the fuel cell vehicle can be reduced, and improvement in the so called fuel economy (e.g., travel distance per unit hydrogen amount) is achieved.

In this case, the predetermined voltage outside the oxidation reduction progress voltage range (oxidation reduction progress region R3) of the FC stack 40 is a high voltage which is higher than the upper limit voltage v3 of the oxidation reduction progress voltage range, and lower than the lower limit voltage v4 of the carbon oxidation progress region R5 (i.e., between v3 and v4) to thereby regulate the motor voltage Vm of the motor 14 during regeneration of electric power at high voltage. Thus, further improvement in the regeneration efficiency is achieved while degradation of the fuel cell is suppressed.

In the case where the predetermined voltage outside the oxidation reduction progress voltage range (oxidation reduction progress region R3) of the FC stack 40 is set at the voltage Vlmi2 (see FIG. 8) where the degradation D of the FC stack 40 is small, within a voltage range (v3<Vcell<v4) which is above the upper limit voltage v3 of the oxidation reduction progress voltage range (oxidation reduction progress region R3), suppression of degradation can be maximized (progress of the degradation can be minimized).

Second Embodiment

In step S61, if it is determined that the temperature Tfc of the FC stack 40 is low (Tfc≤Tlth) (step S61: YES), in step S65, it is determined whether or not the motor 14 is regenerating electric power.

Figure 25:
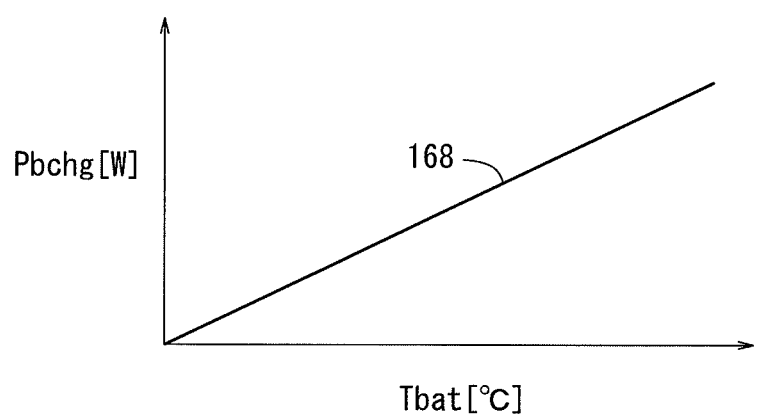
FIG. 25 is a graph showing the relationship between the battery temperature and the battery chargeable electric power.

If the motor 14 is not regenerating electric power, basic control of step S64 is implemented. If the motor 14 is regenerating electric power, i.e., if the motor 14 is regenerating electric power when the temperature Tfc of the FC stack 40 is low (Tfc≤Tlth), in step S66, the electric power (battery chargeable electric power) Pbchg with which the battery 20 can be charged is calculated based on the battery temperature Tbat, with reference to the characteristic 168 of the battery chargeable electric power Pbchg relative to the battery temperature Tbat in FIG. 25.

Next, in step S67, the required regenerative electric power Preg of the motor 14 is calculated by the following equation:

$$Preg = k \times Tqreg \times Nm \times M\eta \qquad (2)$$

where k is a coefficient, Tqreg is a required regeneration torque, Nm is a motor rotation number, and Mη is a motor efficiency during regeneration of electric power.

Next, in step S68, the target power generation electric power Pfctgtlt during regeneration of electric power when the temperature of the FC stack 40 is at low temperature is calculated by the following equation (3). Stated otherwise, the power generation electric power for obtaining (collecting) all the regenerative electric power Preg of the motor 14 is calculated.

$$Pfctgtlt = Pbchg - Preg + Pa \qquad (3)$$

where Pbchg is the battery chargeable electric power calculated in step S66, Preg is the required regenerative electric power calculated in step S67, and Pa is electric power consumed by auxiliary devices such as the air pump 60.

Then, in step S69, mode B' control is implemented. The mode B' control is basically in accordance with the mode B control, which is the voltage fixed/stoichiometric ratio variable current variable control which is the CVVC control as described above.

Figure 26:
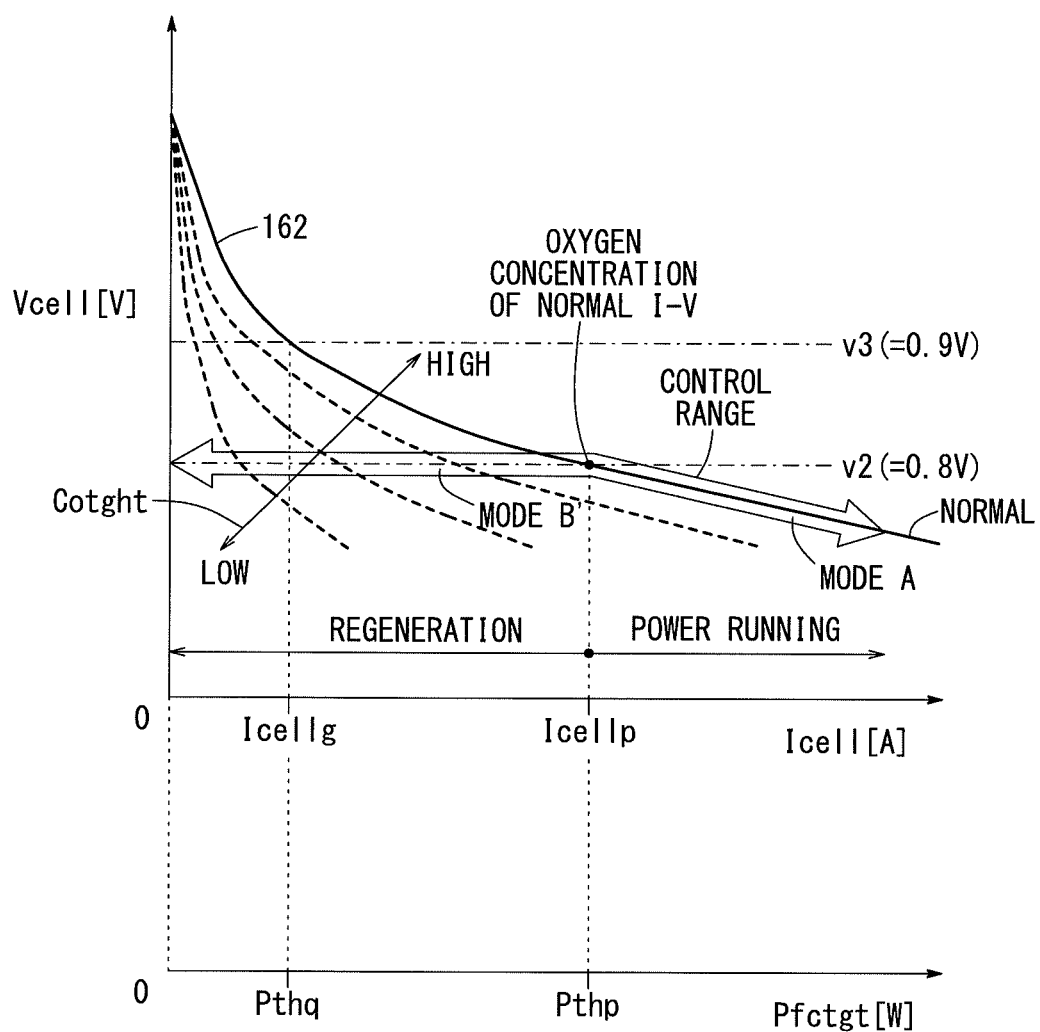
FIG. 26 is a graph showing a plurality of power supply modes during regeneration at a low temperature, etc.

As shown in FIG. 26, in the mode B' control, the target cell voltage Vcelltgt (=target FC voltage Vfctgt/cell number Nfc) is fixed to a reference voltage (in the present embodiment, voltage v2 (=0.8 V)) which is set to be equal to or less than the voltage below the oxidation reduction progress region R3, and the target oxygen concentration Cotgt is variable, and thus, the FC current Ifc is variable.

Under the mode B' control, feedback control of the target oxygen concentration Cotgt is implemented to decrease the FC electrical current Ifc and decrease the power generation electric power of the FC stack 40 such that the power generation electric power during the power running state (mode A control) is regulated to the target power generation electric power Pfctgtlt during regeneration of electric power at low temperature. Though the power generation electric power of the FC stack 40 is decreased, since the target cell voltage Vcelltgt has a low value of v2=0.8 V, the loss of the FC stack 40 becomes large, and warming up of the FC stack 40 is facilitated accordingly.

Figure 21:
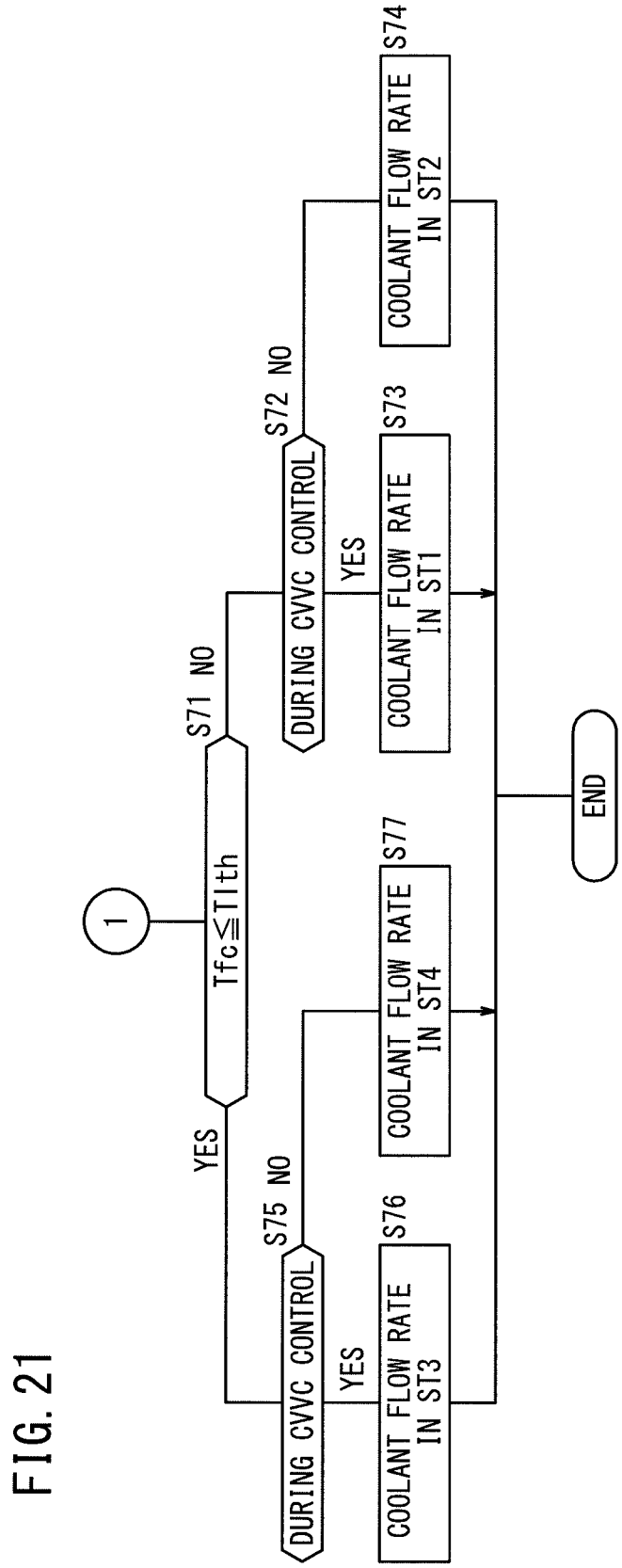
FIG. 21 is a flow chart (2) illustrating energy management and power generation control based on the premise of the basic control modes of FIG. 12.

Next, in accordance with a flow chart of FIG. 21, the flow rate of the coolant Qcm [L/min] of the cooling system 58 for regulating the stack temperature Tfc of the FC stack 40 is determined based on whether or not the temperature of the FC stack 40 is low, and whether or not the FC stack 40 is under the voltage fixed/stoichiometric ratio variable current variable control (CVVC control).

In the second embodiment, the coolant flow rate Qcm is basically determined based on the following conditions (1) to (3).

(1) The rotation number Nwp [rpm] of the water pump 80 for determining the coolant flow rate Qcm [L/min] is determined based on the rotation number Nap [rpm] of the air pump 60 (see FIG. 16). For example, when the rotation number Nap [rpm] of the air pump 60 is increased, the reaction is facilitated, and the temperature of the FC stack 40 is increased. Therefore, the rotation number Nwp [rpm] of the water pump 80 is increased.

(2) When the temperature Tfc of the FC stack 40 is lower than the low temperature determination threshold temperature Tlth, i.e., if it is determined that temperature Tfc of the FC stack 40 is low, the coolant flow rate Qcm is suppressed, whereby increase in the temperature of the FC stack 40 is facilitated.

(3) During the voltage fixed/stoichiometric ratio variable current variable control (CVVC control), in comparison with the state during normal control, the FC voltage Vfc is set to be low with respect to the same value of the FC current Ifc. Thus, the loss of the FC stack 40 is increased, and produced heat becomes large. Therefore, the coolant flow rate Qcm is increased to prevent the temperature of the FC stack 40 from being increased.

Then, in step S71 of FIG. 21, in the same manner as step S61, it is determined whether or not the temperature Tfc of the FC stack 40 is low (whether or not the temperature of the FC stack 40 is equal to or smaller than the low temperature determination threshold temperature Tlth of, for example, 5 [° C.] or 10 [° C.]: Tfc≤Tlth).

If it is determined that the temperature Tfc of the FC stack 40 is not low (step S71: NO, Tfc>Tlth), in step S72, it is determined whether or not the voltage fixed/stoichiometric ratio variable current variable control (CVVC control) is being implemented.

Figure 27:
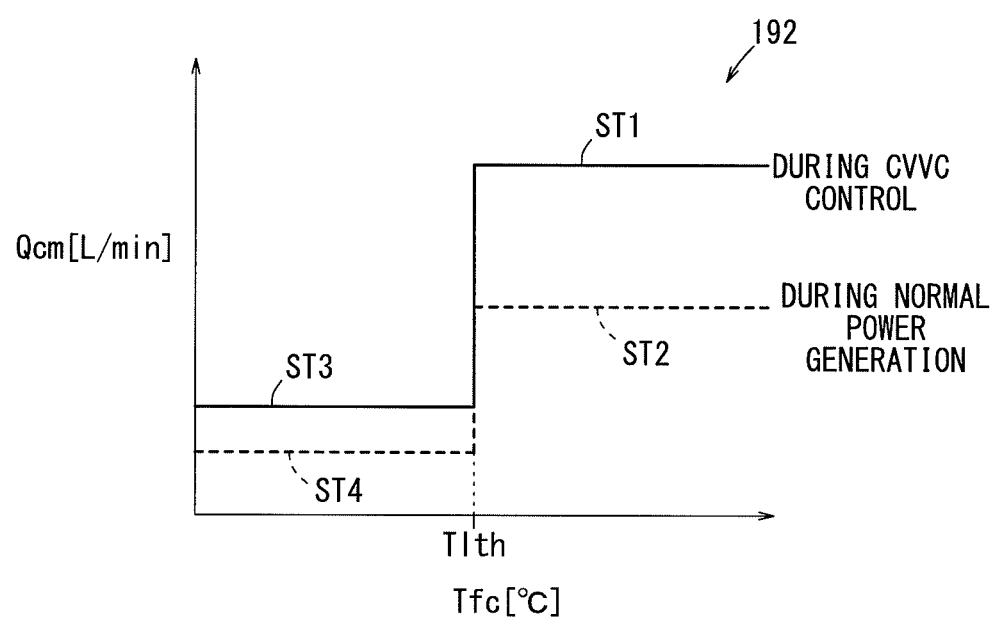
FIG. 27 is a graph showing the relationship between the temperature of the fuel cell stack and the coolant flow rate.

If the temperature Tfc of the FC stack 40 is not low (Tfc>Tlth), and the voltage fixed/stoichiometric ratio variable current variable control (CVVC control) is being implemented, in step S73, the coolant flow rate Qcm is set to the state ST1 where the coolant flow rate Qcm is the largest in a coolant flow rate map (coolant flow rate table) 192 in FIG. 27.

In the determination of step S72, if the voltage fixed/stoichiometric ratio variable current variable control (CVVC control) is not being implemented, i.e., if the normal power generation is being implemented in the state where the temperature Tfc of the FC stack 40 is not low (Tfc>Tlth), in step S74, the coolant flow rate Qcm is set to the state ST2 where the coolant flow rate Qcm is the second largest in the coolant flow rate map (coolant flow rate table) 192 in FIG. 27.

In step S71, if it is determined that the temperature Tfc of the FC stack 40 is low (step S71: YES, Tfc≤Tlth), in step S75, it is determined whether or not the voltage fixed/stoichiometric ratio variable current variable control (CVVC control) is being implemented.

If the temperature Tfc of the FC stack 40 is low (Tfc≤Tlth) and the voltage fixed/stoichiometric ratio variable current variable control (CVVC control) is being implemented, in step S76, the coolant flow rate Qcm is set to the state ST3 where the coolant flow rate Qcm is the second smallest in the coolant flow rate map (coolant flow rate table) 192 in FIG. 27.

In the determination of step S75, if the voltage fixed/stoichiometric ratio variable current variable control (CVVC control) is not being implemented, i.e., if the FC stack 40 is in the middle of normal power generation in the state where the temperature Tfc of the FC stack 40 is low (Tfc≤Tlth), in step S77, the coolant flow rate Qcm is set to the state ST4 where the coolant flow rate Qcm is the smallest in the coolant flow rate map (coolant flow rate table) 192 in FIG. 27.

Summary of Second Embodiment

In the second embodiment as described above, in step S61, when the temperature Tfc of the FC stack 40 is the threshold temperature Tlth or less, i.e., the temperature Tfc of the FC stack 40 is low, in order to fully obtain (fully collect) the regenerative electric power Preg, in steps S66 to S69, the ECU 24 fixes the target FC voltage Vfctgt of the FC stack 40 to the lower limit voltage v2 or less outside the oxidation reduction progress voltage range of the FC stack 40 (in the second embodiment, the target FC voltage Vfctgt is fixed to v2) to implement the voltage fixed/stoichiometric ratio variable current variable control (CVVC control). Since the target FC voltage Vfctgt is fixed to the lower limit voltage v2, the heat loss of the FC stack 40 is increased, and warming up of the FC stack 40 is facilitated accordingly.

In order to further effectively warm up the FC stack 40, in step S71, at the time of implementing the voltage fixed/stoichiometric ratio variable current variable control (CVVC control) when the temperature Tfc of the FC stack 40 is the low temperature determination threshold temperature Tlth or less, i.e., the temperature Tfc of the FC stack 40 is low, preferably, the ECU 24 decreases the coolant flow rate Qcm to the state ST3.

Figure 28:
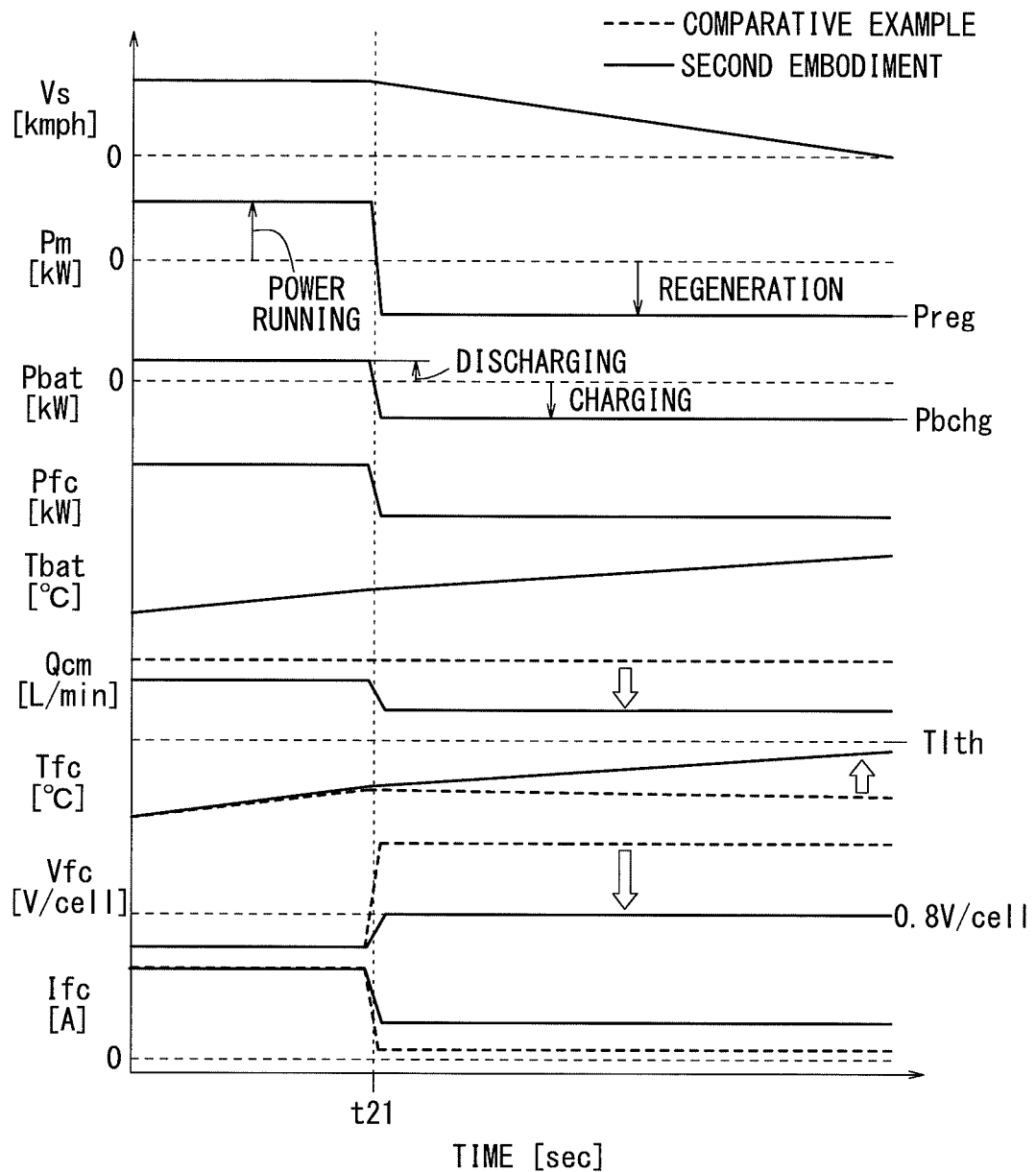
FIG. 28 is a time chart illustrating a technique of a second embodiment in comparison with a comparative example.

FIG. 28 is a time chart in the case where it is determined that the motor 14 is regenerating electric power at low temperature at time t21.

In FIG. 28, in the portion of the time chart drawn below the chart of the coolant flow rate Qcm [L/min], bold broken lines show change characteristics in the comparative example, and bold solid lines denote change characteristics in this second embodiment.

At time t21, if deceleration of the velocity Vs is started, the motor 14 starts regeneration of electric power. In the entire time range including the time t21, since it is determined that the temperature Tfc of the FC stack 40 is the low temperature determination threshold temperature Tlth or less, after time 21, the target FC voltage Vfctgt of the FC stack 40 is fixed to the lower limit voltage v2 outside the oxidation reduction progress voltage range, and the voltage fixed/stoichiometric ratio variable current variable control (CVVC control) is implemented to cause the heat loss, and decrease the FC electric power Pfc. Then, the regenerative electric power Preg is supplied for charging as the battery chargeable electric power Pbchg.

Further, after time t21, the coolant flow rate Qcm is decreased to the state ST3.

Therefore, during regeneration of electric power at low temperature after time t21, it is possible to increase the temperature Tfc of the FC stack 40.

Third Embodiment

Figure 29:
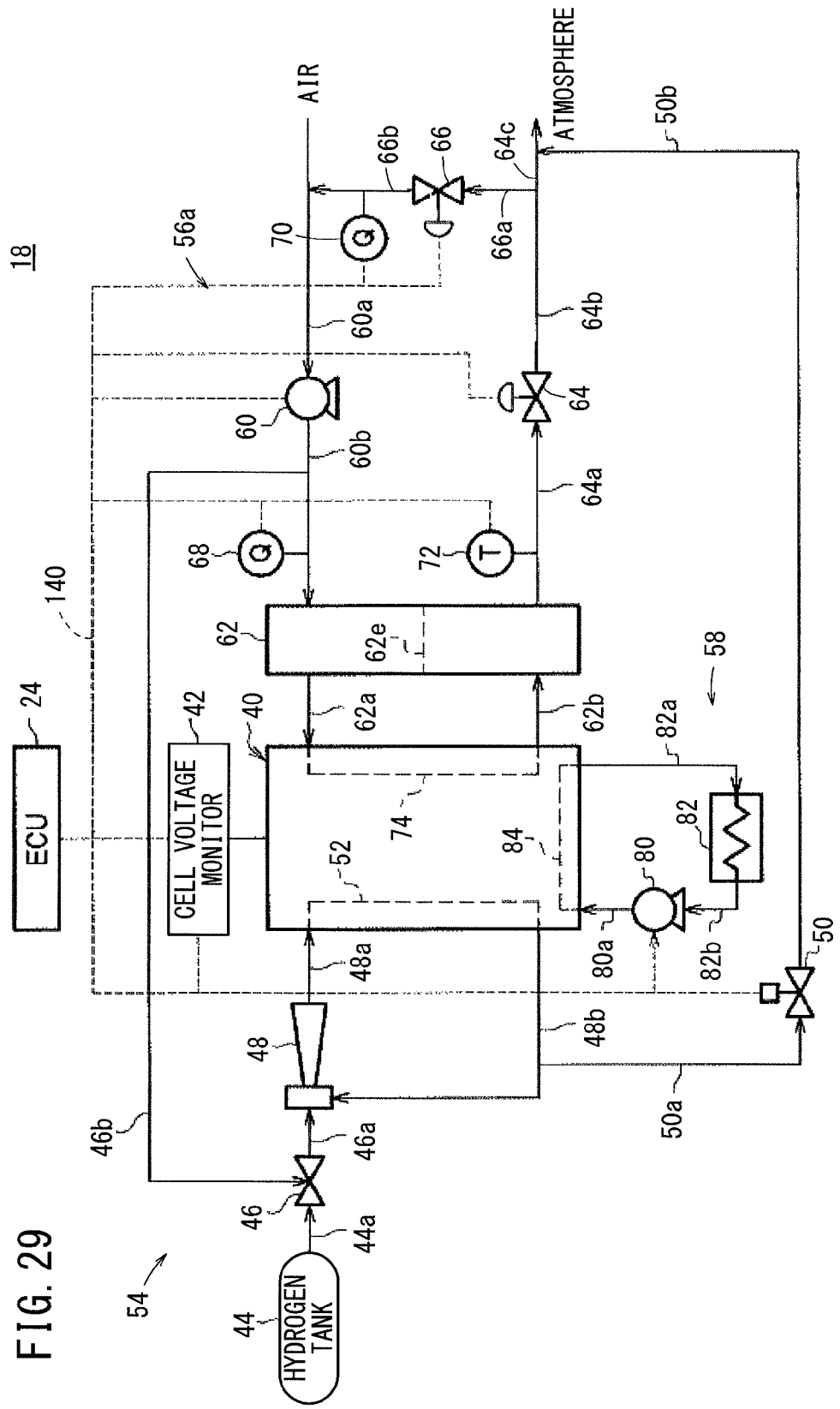
FIG. 29 is a diagram schematically showing a fuel cell unit according to a third embodiment.

FIG. 29 is a diagram schematically showing a structure of the FC unit 18 according to a third embodiment. In the FC unit 18 according to the third embodiment, in the cathode system 56*a*, a circulation valve (cathode circulation valve) 66 is included in addition to the air pump 60, the humidifier 62, and the back pressure valve 64.

In this case, the pipe 66*a*, the circulation valve 66, and the pipe 66*b* are connected between the pipe 64*b* on the output side of the back pressure valve 64 and the pipe 60*a* on the air intake side (input side). Thus, some of the exhaust gas (cathode off gas) is supplied as a circulating gas to the pipe 60*a* through the pipe 66*a*, the circulation valve 66, and the pipe 66*b*. The exhaust gas is mixed with the fresh air from the outside of the vehicle, and sucked into the air pump 60.

For example, the circulation valve 66 is a butterfly valve, and the opening degree of the butterfly valve (hereinafter referred to as the "circulation valve opening degree θc" or the "opening degree θc") is controlled by the ECU 24 to regulate the flow rate of the circulating gas. A flow rate sensor 70 is connected to the pipe 66*b*, and the flow rate sensor 70 detects the flow rate Qc [g/s] of the circulating gas flowing toward the pipe 60*a*, and outputs the detected flow rate to the ECU 24.

Figure 30:
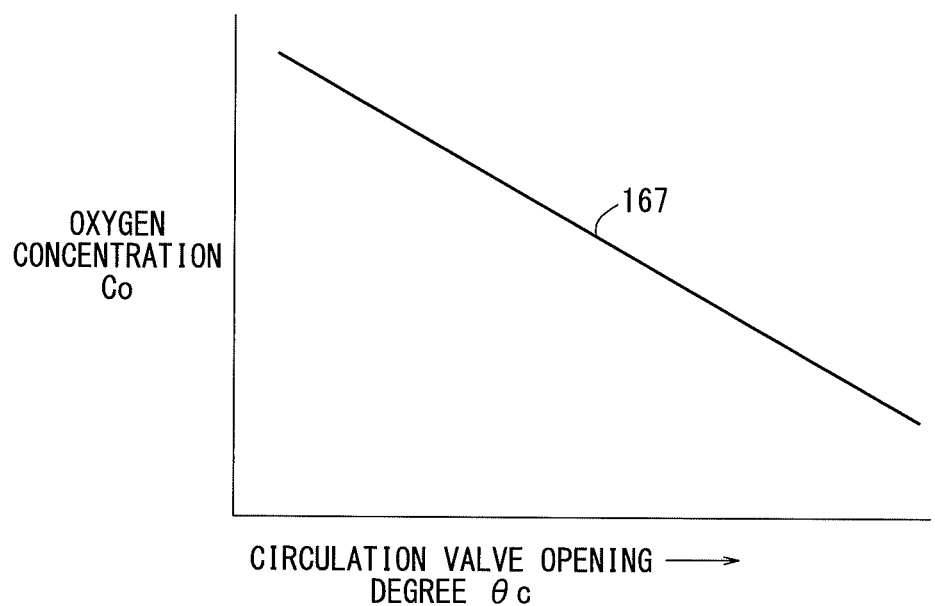
FIG. 30 is a graph showing the relationship between the valve opening degree of a circulation valve and the oxygen concentration in a cathode channel.

As shown a characteristic 167 in FIG. 30, with the increase in the circulation valve opening degree θc of the circulation valve 66 for allowing the exhaust gas to flow through the circulation valve 66, the oxygen concentration Co in the cathode channel 74 is decreased.

In this regard, in the third embodiment, at the time of regeneration of electric power by the motor 14, in the state where the FC voltage Vfc of the FC stack 40 is fixed within a predetermined voltage range (voltage within the stable oxidation region R4 between v3 and v4) outside the oxidation reduction progress voltage range (oxidation reduction progress region R3) of the FC stack 40 by the DC/DC converter 22 (e.g., the FC voltage Vfc is fixed at v3 or Vlmi2 (Vfc=v3 or Vfc=Vlmi2)), when the target oxygen concentration Cotgt is changed, only the opening degree θc of the circulation valve 66 is changed, whereby the FC current Ifc is made variable.

In this manner, in the state where the voltage of the FC stack 40 is fixed to a voltage outside the oxidation reduction progress voltage range (oxidation reduction progress region R3) of the FC stack 40 by the DC/DC converter 22, the opening degree θc of the circulation valve 66 is changed to decrease the electric power outputted from the FC stack 40. In this manner, degradation of the FC stack 40 is suppressed (see FIG. 8), and in the state where the degradation is suppressed, the regenerative electric power Preg obtained by regeneration is collected into the battery 20. Thus, by the decrease in the electric power outputted from the FC stack 40, the regenerative electric power Preg can be collected effectively. Therefore, improvement in the efficiency of collecting the regenerative electric power Preg (regeneration efficiency) is achieved while suppressing degradation of the FC stack 40. As a result, it is possible to improve the system efficiency.

Also in this case, the predetermined voltage outside the oxidation reduction progress voltage range (oxidation reduction progress region R3) of the FC stack 40 is set at a high voltage which is higher than the upper limit voltage v3 of the oxidation reduction progress voltage range, and lower than the lower limit voltage v4 of the carbon oxidation progress region R5 (i.e., between v3 and v4). Thus, the motor voltage Vm of the motor 14 during regeneration of electric power becomes high, and then further improvement in the regeneration efficiency is achieved with suppression of degradation of the fuel cell.

When the predetermined voltage outside the oxidation reduction progress voltage range (oxidation reduction progress region R3) of the FC stack 40 is set to the voltage Vlmi2 (see FIG. 8) where degradation of the FC stack 40 is small, within a high voltage range exceeding the upper limit voltage v3 of the oxidation reduction progress voltage range (oxidation reduction progress region R3) (v3<Vcell<v4), suppression of degradation is maximized (progress of degradation is minimized).

That is, in the third embodiment, at the time of implementing the regeneration control, unlike the first embodiment, without changing the rotation number Nap of the air pump 60 and the opening degree θbp of the back pressure valve 64, only the opening degree θc of the circulation valve 66 is changed thereby to change the FC current Ifc. Therefore, control can be simplified advantageously.

MODIFIED EXAMPLES

The present invention is not limited to the above described embodiments. The present invention can adopt various structures based on the description herein. For example, the following structure may be adopted.

In the above embodiments, though the FC system 12 is mounted in the FC vehicle 10, the present invention is not limited in this respect. The FC system 12 may be mounted in other objects. For example, the FC system 12 may be used in movable objects such as ships or airplanes. Alternatively, the FC system 12 may be applied to household power systems.

Figure 31:
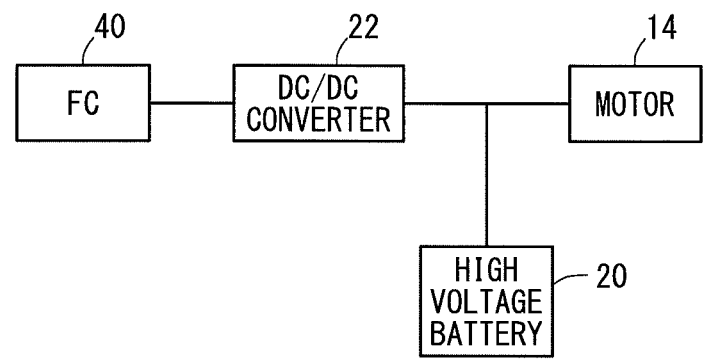
FIG. 31 is a block diagram schematically showing a structure of a first modified example of the fuel cell system.
Figure 32:
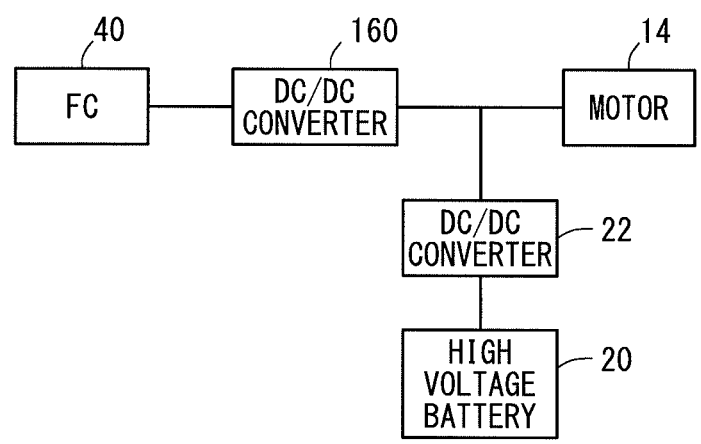
FIG. 32 is a block diagram schematically showing a structure of a second modified example of the fuel cell system.
Figure 33:
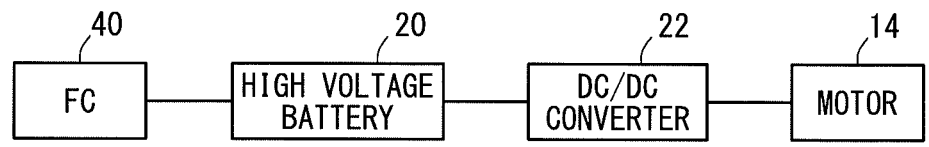
FIG. 33 is a block diagram schematically showing a structure of a third modified example of the fuel cell system.

In the above embodiments, the FC stack 40 and the high-voltage battery 20 are arranged in parallel, and the DC/DC converter 22 is provided on the near side of the battery 20. However, the present invention is not limited in this respect. For example, as shown in FIG. 31, the FC stack 40 and the battery 20 may be provided in parallel, and a step-up, step-down, or step-up/step-down DC/DC converter 22 may be provided on the near side of the FC stack 40. Alternatively, as shown in FIG. 32, the FC stack 40 and the battery 20 may be provided in parallel, and a DC/DC converter 160 may be provided on the near side of the FC stack 40 and the DC/DC converter 22 may be provided on the near side of the battery 20. Alternatively, as shown in FIG. 33, the FC stack 40 and the battery 20 may be provided in series, and the DC/DC converter 22 may be provided between the battery 20 and the motor 14.

In the above embodiments, a unit or a method of adjusting the stoichiometric ratio is performed by adjusting the target oxygen concentration Cotgt. However, the present invention is not limited in this respect. Alternatively, target hydrogen concentration may be adjusted. Further, instead of the target concentration, the target flow rate, or both of the target concentration and the target flow rate may be adjusted.

In the above described embodiments, a structure including the air pump 60 for supplying air containing oxygen is illustrated. Alternatively or additionally, a structure including a hydrogen pump for supplying hydrogen may be adopted.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell vehicle comprising:
a fuel cell for performing power generation by inducing, by catalyst, reaction of a first gas containing oxygen and a second gas containing hydrogen supplied to the fuel cell;
a gas supply unit for supplying at least one of the first gas and the second gas to the fuel cell;
a voltage regulator for regulating output voltage of the fuel cell;
a drive motor as a load driven by electric power outputted from the fuel cell;
an energy storage device for storing electric power regenerated by the drive motor; and
a control unit for controlling the fuel cell, the gas supply unit, the voltage regulator, the drive motor, and the energy storage device,
wherein at the time of regeneration of electric power by the drive motor, the control unit is adapted for controlling the voltage regulator to fix the voltage of the fuel cell at a predetermined voltage outside an oxidation reduction progress voltage range of the fuel cell where oxidation reduction proceeds, while controlling the gas supply unit to decrease oxygen concentration or hydrogen concentration, thereby for decreasing electric power outputted from the fuel cell.

2. The fuel cell vehicle according to claim 1, wherein the predetermined voltage outside the oxidation reduction progress voltage range of the fuel cell is set to a voltage that exceeds an upper limit voltage of the oxidation reduction progress voltage range.

3. The fuel cell vehicle according to claim 2, wherein the predetermined voltage outside the oxidation reduction progress voltage range of the fuel cell is set to a voltage where degradation of the fuel cell is small, within a range of the voltage that exceeds the upper limit voltage of the oxidation reduction progress voltage range.

4. The fuel cell vehicle according to claim 1, further comprising a temperature sensor for detecting the temperature of the fuel cell,
    wherein if the control unit determines that the temperature of the fuel cell detected by the temperature sensor is a threshold temperature or less, the control unit sets the predetermined voltage outside the oxidation reduction progress voltage range of the fuel cell to a voltage that is lower than a lower limit voltage of the oxidation reduction progress voltage range.

5. The fuel cell vehicle according to claim 4, further comprising a cooling unit for cooling the fuel cell by a coolant,
    wherein if the control unit determines that the temperature of the fuel cell detected by the temperature sensor is the threshold temperature or less, the control unit controls the cooling unit to decrease the flow rate of the coolant.

* * * * *